United States Patent
Whitehouse et al.

(10) Patent No.: US 8,598,519 B2
(45) Date of Patent: Dec. 3, 2013

(54) MULTIPOLE ION GUIDE ION TRAP MASS SPECTROMETRY WITH MS/MSN ANALYSIS

(75) Inventors: Craig M. Whitehouse, Branford, CT (US); Thomas Dresch, Berlin (DE); Bruce Andrien, Guilford, CT (US)

(73) Assignee: PerkinElmer Health Sciences Inc., Waltham, MA (US)

( * ) Notice: Subject to any disclaimer, the term of this patent is extended or adjusted under 35 U.S.C. 154(b) by 235 days.

(21) Appl. No.: 13/164,590

(22) Filed: Jun. 20, 2011

(65) Prior Publication Data

US 2011/0303840 A1  Dec. 15, 2011

Related U.S. Application Data

(63) Continuation of application No. 09/901,428, filed on Jul. 9, 2001, which is a continuation of application No. 08/694,542, filed on Aug. 9, 1996, now Pat. No. 6,011,259, and a continuation of application No. 09/676,124, filed on Sep. 29, 2000, now abandoned, which is a continuation of application No. 09/373,337, filed on Aug. 12, 1999, now Pat. No. 6,188,066, which is a continuation of application No. 08/794,970, filed on Feb. 5, 1997, now Pat. No. 5,962,851, which is a continuation of application No. 08/645,826, filed on May 14, 1996, now Pat. No. 5,652,427, which is a continuation of application No. 08/202,505, filed on Feb. 28, 1994, now abandoned, application No. 09/901,428, which is a continuation of application No. 09/808,468, filed on Mar. 14, 2001, now Pat. No. 7,019,285, which is a continuation of application No. 09/448,857, filed on Nov. 23, 1999, now abandoned, which is a continuation of application No. 08/971,521, filed on Nov. 17, 1997, now Pat. No. 6,020,586, which is a continuation of application No. 08/689,459, filed on Aug. 9, 1996, now Pat. No. 5,689,111.

(60) Provisional application No. 60/002,117, filed on Aug. 10, 1995, provisional application No. 60/002,118, filed on Aug. 10, 1995, provisional application No. 60/002,122, filed on Aug. 10, 1995.

(51) Int. Cl.
*B01D 59/44* (2006.01)

(52) U.S. Cl.
CPC ................................. *B01D 59/44* (2013.01)
USPC .......................... 250/287; 250/282; 250/292

(58) Field of Classification Search
USPC ................... 250/282, 281, 292, 287
See application file for complete search history.

(56) References Cited

U.S. PATENT DOCUMENTS 3,334,225 A    8/1967  Langmuir
4,234,791 A *  11/1980 Enke et al. ................. 250/281

(Continued)

FOREIGN PATENT DOCUMENTS

EP          529885          9/1993

OTHER PUBLICATIONS

Michael et al., "An Ion Trap Storage/Time-of-Flight Spectrometer", Rev. Sci. Instruments, vol. 63, No. 10, pp. 4277-4284 (Oct. 1992).

(Continued)

*Primary Examiner* — Kiet T Nguyen
(74) *Attorney, Agent, or Firm* — Fish & Richardson P.C.

(57) ABSTRACT

A method includes directing ions from an atmospheric pressure ion source to a first ion guide; directing ions in the first ion guide to a second ion guide, the second ion guide being a multipole ion guide extending along an axis; periodically directing ions along the axis; receiving at least some of the ions in a time-of-flight analyzer; accelerating the ions in the time-of-flight mass analyzer orthogonal to the axis; and detecting the accelerated ions.

11 Claims, 9 Drawing Sheets

(56) References Cited

U.S. PATENT DOCUMENTS

| | | |
|---|---|---|
| 4,542,293 A | 9/1985 | Fenn et al. |
| 4,731,533 A | 3/1988 | Vestal |
| 4,861,988 A | 8/1989 | Henion et al. |
| 4,963,736 A | 10/1990 | Douglas et al. |
| 5,026,987 A | 6/1991 | Bier et al. |
| 5,157,260 A | 10/1992 | Mylchreest et al. |
| 5,179,278 A | 1/1993 | Douglas |
| 5,345,078 A | 9/1994 | Kelley |
| 5,420,425 A | 5/1995 | Bier et al. |
| 5,572,022 A | 11/1996 | Schwartz et al. |
| 5,572,035 A | 11/1996 | Franzen |
| 5,576,540 A | 11/1996 | Jolliffe |
| 5,652,427 A | 7/1997 | Whitehouse et al. |
| 5,663,560 A | 9/1997 | Sakairi et al. |
| 5,663,561 A | 9/1997 | Franzen et al. |
| 5,689,111 A | 11/1997 | Dresh et al. |
| 5,763,878 A | 6/1998 | Franzen |
| 5,818,041 A | 10/1998 | Mordehai et al. |
| 5,847,386 A | 12/1998 | Thomson et al. |
| 6,011,259 A | 1/2000 | Whitehouse et al. |

OTHER PUBLICATIONS

RCM Letter to the Editor, "Time-of-flight Mass Analysis of High-energy Collision-induced Dissociation Fragment Ions", John Wiley & Sons, Ltd., pp. 719-710 (1992).

* cited by examiner

MULTIPOLE ION GUIDE ION TRAP MASS SPECTROMETRY WITH MS/MSN ANALYSIS

CROSS REFERENCE TO RELATED APPLICATIONS

This application is a continuation of U.S. patent application Ser. No. 09/901,428, filed Jul. 9, 2001, which is a continuation of U.S. patent application Ser. No. 08/694,542, filed Aug. 8, 1996, now U.S. Pat. No. 6,011,259, issued on Jan. 4, 2000, which claims priority to Provisional Application No. 60/002,117, filed Aug. 10, 1995.

U.S. patent application Ser. No. 09/901,428 is also a continuation of U.S. patent application Ser. No. 09/676,124, filed Sep. 29, 2000, which is a continuation of U.S. patent application Ser. No. 09/373,337, filed Aug. 12, 1999, now U.S. Pat. No. 6,188,066, issued on Feb. 13, 2001, which is a continuation of U.S. patent application Ser. No. 08/794,970, filed Feb. 5, 1997, now U.S. Pat. No. 5,962,851 issued on Oct. 5, 1999, which is a continuation of U.S. patent application Ser. No. 08/645,826, filed May 14, 1996, now U.S. Pat. No. 5,652,427 issued on Jul. 29, 1997, which is a continuation of U.S. patent application Ser. No. 08/202,505, filed Feb. 28, 1994, now abandoned. U.S. patent application Ser. No. 09/901,428 is also a continuation of U.S. patent application Ser. No. 09/808,468, filed Mar. 14, 2001, now U.S. Pat. No. 7,019,285 issued on Mar. 28, 2006, which is a continuation of U.S. patent application Ser. No. 09/448,857, filed Nov. 23, 1999, now abandoned, which is a continuation of U.S. patent application Ser. No. 08/971,521, filed Nov. 17, 1997, now U.S. Pat. No. 6,020,586 issued on Feb. 1, 2000, which is a continuation of U.S. patent application Ser. No. 08/689,459, filed Aug. 9, 1996, now U.S. Pat. No. 5,689,111 issued on Nov. 18, 1997, which claims priority to Provisional Application No. 60/002,118, filed Aug. 10, 1995 and Provisional Application No. 60/002,122, filed Aug. 10, 1995.

FIELD OF INVENTION

The invention relates to the field of mass analysis and the apparatus and methods used in analyzing chemical species. It is a continuing goal in the field of chemical and mass analysis to improve the performance of mass analyzers and include more functional capability within a given instrument while reducing the instrument size, cost and complexity. The invention allows single or multiple mass selection, and fragmentation steps (MS/MS$^n$) in Time-Of-Flight (TOF) mass analyzers by including a multipole ion guide in the ion flight path between the ion source and the mass analyzer. Multipole ion guides have been used in mass analyzers with Atmospheric Pressure Ion Sources (API) to improve ion transmission performance as is described in U.S. Pat. Nos. 4,963,736 and 5,179,278. In particular, the use of a multipole ion guide has been shown to improve the performance of mass analyzers with API sources such as Electrospray (ES) and Atmospheric Pressure Chemical Ionization (APCI). MS/MS$^n$ functional capability described herein as part of the invention can be achieved with a minimum increase to System cost, size or complexity. API ion source types have been successfully used in interfacing mass spectrometers to liquid separation systems such as Liquid Chromatography (LC) and Capillary Electrophoresis (CE). The invention will enable the TOF mass analyzer to perform an array of mass and fragmentation analytical functions in a chemical analysis even while on-line with separation systems. One aspect of the invention which uses a Time-Of-Flight mass analyzer is that the instrument is capable of rapid full m/z range data acquisition speeds. MS and MS/MS$^n$ analysis as described by the invention can be performed on line even with fast separation systems such as perfusion LC and CE.

BACKGROUND OF THE INVENTION

The fragmentation of ions and subsequent mass analysis of the fragments has become a powerful technique used in chemical analysis. As the performance improves and the capability of mass analyzers increases, the instrumentation has been applied to a wider range of analytical methods. The mass analyzer has become a primary tool in the detection, identification and structural determination of chemical samples. The invention is an apparatus with means for incorporating single and multiple step mass selection and ion fragmentation capability with TOF mass analysis. This is accomplished by using at least one multipole ion guide for ion transmission or trapping along with fragmentation of ions within the multipole ion guide internal volume by collisional induced dissociation. The invention can be configured with orthogonal and coaxial pulsing TOF mass analyzers.

Ion fragmentation caused by Collisional Induced Dissociation (CID) of an ion with neutral background gas has been a technique used in mass spectrometry for some time. The CID step may or may not be accompanied by a mass selection step. Often mass to charge (m/z) selection is used prior to ion fragmentation using CID so that the resulting fragment ions can be more readily identified as having been produced from fragmentation of a given selected parent ion. If more than one parent ion undergoes fragmentation simultaneously then it may be difficult to identify which fragment ions have been generated from which parent ions in the resulting mass spectrum. The mass selection, fragmentation and subsequent mass analysis steps can be achieved with multiple mass analyzers used in series or with ion trapping devices which include mass analysis capability. Multiple mass analyzers, such as triple quadrupoles, which are used to achieve selective CID collision have been commercially available for some time and hence the term MS/MS has become commonly used to mean a mass selection step followed by and ion fragmentation step, followed by a mass analysis step of the fragment ions. The term MS/MS$^n$ has come to mean multiple mass selection and fragmentation steps leading to one or more mass spectrum which may be acquired at each step or at the end of the last fragmentation step. In a preferred embodiment of the invention, a multipole ion guide is incorporated into an API TOF mass analyzer with orthogonal pulsing of the primary ion beam into the flight tube. Alternatively an axial collinear TOF pulsing geometry can also be configured. The multipole ion guide is located in the second vacuum pumping stage just downstream of the skimmer and may be configured to end in vacuum pumping stage two or extend continuously into one or more additional vacuum pumping stages. Such multipole ion guides are disclosed in prior U.S. patent application Ser. Nos. 08/641,628 (filed May 2, 1996) and 08/208,632 (filed Mar. 8, 1994), the disclosures of which are hereby incorporated herein by reference. The multipole ion guide can be operated in a manner to transmit ions which are delivered into the ion guide entrance from the API source through the skimmer and direct them into the pulsing region of the TOF mass analyzer. Alternatively, the ion multipole ion guide can be operated in a manner where the ions are trapped within the ion guide internal volume which is bounded by the evenly spaced rods or poles of the ion guide before being transmitted to pulsing region of the TOE mass analyzer. In either ion transmission or trapping mode of operation, the voltages applied to the ion guide poles can lie set to transmit or trap a narrow m/z range of ions and cause fragmentation of selected m/z ions by CID of the ions with the background gas.

Multipole ion guides can be configured with four (quadrupole), six (hexapole), eight (octapole) or more rods or poles with each rod equally spaced at a common radius from the centerline and with all rods positioned in a parallel manner. Ions with m/z values which fall within the ion guide stability window established by the applied voltages, have stable trajectories within the ion guide internal volume bounded by the parallel evenly spaced rods. In conventional multipole ion guide operation, with no ion resonant frequency component added, every other pole or rod has the same voltage applied and each adjacent pole has the same amplitude voltage but the opposite polarity applied. Multipole ion guides with higher rod numbers have a larger ion acceptance area and can in a stable trajectory transmit a wider range of m/z values simultaneously. Higher resolving power can be achieved for multipole ion guides with a lower number of poles when operating the ion guide in manner where narrow m/z selection is desired. For example, a narrow m/z window of stable ion transmission is more readily achievable using a quadrupole ion guide when compared with hexapole or octapole ion guide performance. As narrow m/z range mass selection is desirable for some MS/MS" applications, a quadrupole ion guide will be included in a preferred embodiment of the invention. For applications where narrow m/z range selection is not required, a hexapole or octapole may be preferred. This could be the case where a front end separation system such as LC or CE has been employed to achieve component separation before the sample is introduced into the API TOF instrument. If the components are delivered individually to the API source subsequent mass selection may not be required before the fragmentation step.

AC and DC voltage components are applied to the parallel poles of a quadrupole ion guide in a manner which causes a stable or unstable ion trajectory for specific m/z values as an ion traverses the length of the ion guide internal volume. In Cartesian coordinates, the equations of motion for an ion traversing the electric fields applied to a quadrupole ion guide as reported by Dawson P. H. ("Quadrupole Mass Spectrometry and its applications", Elsevier Scientific Publishing Co., New York, 1976) are described by the Mathieu Equations;

$$\frac{d^2 u}{d\xi^2} + (a_u - 2q_u \cos 2\xi)u = 0 \quad (1)$$

and $$\frac{d^2 z}{d^2 \xi^2} = 0 \quad (2)$$

The z coordinate is along the multipole in guide axis, and the x and y axis describe the radial plane with the centerline of two opposing poles lying on the y axis and the centerline of the remaining two opposing poles lying on the x axis. A cross section of the quadrupole with round rods is diagrammed in FIG. 10. The centerline 109 of quadrupole 108 lies at the intersection of the x and y axis. The centerline of rods 104 and 106 lie along the x axis and the centerline of rods 105 and 107 lie along the y axis. All rods have the same radius and all rod centerlines lie on a common radius from quadrupole centerline 109. The distance from centerline 109 to the intersection point of a rod surface is defined to be $r_0$. In the quadrupole field created by the voltages applied to the ion guide rods, the ion motion along each of the three axis is independent, so u is either x or y and $a_u$ and $q_u$ are defined by the relations;

$$a_u = a_x = -a_y = \frac{4U}{\frac{m}{z}\omega^2 r_0^2} \quad (3)$$

and $$q_u = q_x = -q_y = \frac{2V}{\frac{m}{z}\omega^2 r_0^2}. \quad (4)$$

U is the DC voltage component amplitude, V is the primary AC or RF component frequency amplitude, m/z is the ion mass to charge, $\omega=2\pi f$ is the angular frequency of the primary AC voltage component, $r_0$ is the radial distance from the ion guide assembly centerline to the nearest inside rod surface and $\xi=\omega t/2=\pi f t$ where t is time in seconds and f is the primary AC voltage frequency. The solution of equation 1 can be expressed in terms of variables a, q and µ where µ is a purely imaginary number defined as µ=iβ. The variable β is related to the frequency components of the ion motion in the x and y directions as the ion traverses or is trapped in the ion guide. The fundamental frequency of the ion motion is given by the relation $$\omega_0 = \beta\omega/2 \quad (5).$$

The lower and upper limits of ion stability are the boundaries where β=0 and 1 respectively as shown in the x and y ion movement overlapping stability region 102 diagrammed in FIG. 9. When the AC voltage component is applied to the ion guide poles with relative rod to rod DC voltage component set to zero the ion guide operates along the a=0 axis 101 on the stability diagram 102 in FIG. 9. For the case of a=0 operation where $\beta_y, \beta_x$, Reinsfelder and Denton [International J. of Mass Spectrom and Ion Physics, 37 (1981), 241] have shown that q can expressed as a function of β by the relation $$q = 2\beta(1 - 0.375\beta^2) \quad (6).$$

Combining equations 4, 5 and 6, the motion of each m/z value traversing the ion guide has a primary resonant frequency in the a=0 (RF only) operating mode predicted by the relation $$\frac{m}{z} = \frac{V}{r_0^2 \omega_0 \omega \left[1 - 1.5\left(\frac{\omega_0}{\omega}\right)^2\right]} = \frac{V\omega}{r_0^2 \omega_0 \left[\omega^2 - \frac{3}{2}\omega_0^2\right]}. \quad (7)$$

Watson et. al, [International, J. of Mass Spectrom and Ion Processes, 93 (1989) 225] have reported that a resonant frequency applied as a supplementary lower frequency AC voltage to two opposing or all four multipole rods can successfully reject a narrow m/z range of ions even with a single pass through the quadrupole ion guide operated in the RF only mode. The resonant frequency for a given m/z value may differ slightly from the predicted value given by expression 7. This is due in part to entrance effects on ion trajectory, distortions in the electric fields due to rod tolerances and round rod shapes typically used in quadrupole ion guide construction instead of hyperbolic rod cross sections. With the ion motion in a quadrupole ion guide readily controlled by applied AC and DC voltage components, a number of methods can be employed to achieve m/z selection and CID fragmentation steps. As is shown in formulas 1 and 2, the z or axial component of ion motion is independent of the ion motion in the radial direction in a multipole ion guide parallel rod quadrupole field. Consequently, similar functions can be achieved on a single pass or in ion trapping mode. The ability of the TOF mass analyzer to acquire full mass spectra at a rapid rate offers several advantages over other mass analyzer types when it is combined with quadrupole ion guide which can be run in mass selection and ion fragmentation operating modes.

Several techniques to achieve specific m/z range selection are possible when operating with quadrupole ion guides. One technique method is to apply AC and DC voltage component values which fall near the top 100 of stability region 102 as shown in FIG. 9. The a and q values resulting from the applied AC and DC voltage components will fall in the area 100 near the top of stability diagram 102, that is the point where q=0.706 and a=0.237, for a select range of m/z values. The closer the a and q values are to the tip 100 of stability diagram 102, 0.237 and 0.706 respectively for a given m/z value, the higher the resolution for that selected m/z value and hence the narrower the range of m/z values that have a stable trajectory and can pass through or remain trapped in the quadrupole ion guide. A single range of m/z values can be selected in this manner with the range being determined by values of a and q selected which fall within stability diagram 102 shown in FIG. 9. Sensitivity may be reduced when operating the quadrupole at higher resolution. Dawson has shown that the closer the quadrupole is operated to the apex region 100 of stability diagram 102, the smaller the effective quadrupole ion entrance aperture becomes. This mass selection operating method has the characteristic that as resolution increases the useable ion entrance aperture decreases, potentially reducing sensitivity. A second technique described by Langmuir in U.S. Pat. No. 3,334,225 and later Douglas in U.S. Pat. No. 5,179,278, provides an alternative means of achieving mass selection by applying an additional broad band resonant ion excitation frequency voltage added to the AC voltage component applied two opposing or all four rods while filtering out the resonant frequency for the range of m/z values selected. Ion m/z values which correspond to the applied resonant frequency range are gain translational energy in the radial direction of motion and are ejected radially from the quadrupole ion guide. DC voltage components can be added to the rods as well to cut off the high and low m/z values which may fall beyond the applied resonant frequency range. Kelly, in U.S. Pat. No. 5,345,078 describes a similar mass selection technique while storing ions in a three dimensional ion trap. This notch filter mass selection can be used to trap or pass more than one range of m/z values in the quadrupole ion guide. Using inverse Fourier Transforms applied to define the signal output of waveform generators, several notches can be programmed into the auxiliary resonant frequency waveform added to the quadrupole rods resulting in the simultaneous selection of multiple m/z values. A third mass selection technique is to trap a wide range of m/z values ions in a quadrupole ion guide at low resolution and then apply AC and DC voltage components to the rods improving resolution. and rejecting unwanted m/z values above and below the selected m/z range. Alternatively, ions can be trapped in the quadruple operating in the RF only mode along a=0 line 101 in FIG. 9 and the AC voltage amplitude component can be varied such that ions above and below the desired m/z value are rejected from the quadrupole ion guide while those or interest remain trapped.

The m/z selection step is followed by an ion fragmentation step in MS/MS$^n$ analysis. A multipole ion guide located in the second vacuum pumping stage of an API MS system can operate effectively in background pressures as high as $10^{-3}$ to $10^{-2}$ torr range. Operation of a multipole ion guide in higher pressure vacuum regions for transmitting ions from an API source to an mass analyzer was described by C. Whitehouse et. al, in a paper presented at the 12 Montreux Liquid Chromatography and Mass Spectrometry Symposium in Hilton Head, S.C., November 1995. Performance of ion guides incorporated into API/MS instruments which extend into more than one vacuum pumping stage were described. Ion guides were operated with little or no loss in ion transmission efficiency in vacuum background pressures as high as 180 millitorr over a portion of the ion guide length. The higher background pressure inside the ion guide internal volume caused a collisional damping of the ion energy for ions traversing the ion guide length and effectively increased the ion guide entrance aperture, D. Douglas et, al, in U.S. Pat. No. 4,963,736 reported increased ion transmission efficiencies when a quadrupole ion guide operated in RF only mode and located in single vacuum pumping stage in an API/quadrupole mass analyzer was run with background pressures between 4 to 10 millitorr. When higher pressures are maintained over all or a portion of the multipole ion guide length, ions within the ion guide internal volume can be fragmented by collision induced dissociation with the neutral background molecules. Douglas ('278) describes applying a resonant frequency of low amplitude to the rods of a quadrupole ion guide to fragment mass selected trapped ions by CID with the neutral background gas before conducting a mass analysis step with a three dimensional quadrupole ion trap. At least two additional techniques may be used to cause fragmentation of ions in a multipole ion guide where the pressure along portion the ion guide length is greater than $5 \times 10^{-4}$ torr. In the first alternative technique, trapped ions are initially released from the ion guide exit end by changing the appropriate ion guide and electrostatic lens voltages. The energy of the released ions is then raised by changing the voltage applied to two electrostatic lenses as the ions traverse the gap between these lenses. The ions with raised potential are then accelerated back into the ion guide exit where ion fragmentation can occur as ions collide with neutral background gas as the ions traverse the ion guide volume moving toward the ion guide entrance end. Higher energy CID can be achieved with this ion fragmentation technique. The second method is to fill the multipole trap to a level where fragmentation of the trapped ion occurs. Techniques which use CID of ions within the multipole ion guide internal volume in an API/TOF mass analyzer will described in more detail below.

The invention which includes a multipole ion guide or trap in an API/TOF mass analyzer allows several performance advantages and a more diverse range of operating functions when compared with other API/ion trap/mass analyzer types. S. Michael et, al. (Anal. Chem, 65 (1993), 2614) describes the using a three dimensional quadrupole ion trap to trap ions delivered from an Electrospray ion source in a TOF mass analyzer apparatus. The trapped ions are then pulsed from the three dimensional quadruple ion trap linearly down the flight tube of a TOF mass analyzer. The three dimensional ion trap can be used for mass selection and CID fragmentation as well prior to TOF mass analysis. A multipole ion guide functionally is the reciprocal of the three dimensional quadrupole ion trap (3D ion trap) and as such the multipole ion guide is more compatible with TOF operation when it is incorporated into a TOF mass analyzer. When trapping ions, both the multipole ion guide and the 3D ion trap must have voltages applied which will allow stable ion motion for the trapped m/z range of interest. For an ion to leave a 3D ion trap it must be forced into an unstable trajectory. For an ion to leave the end of a multipole ion guide it must have a stable ion trajectory. Thus, a multipole ion guide can be operated in either a trapping or non trapping ion transfer mode when delivering ions to the pulsing region of a TOF analyzer. A 3D ion trap can not be operated in a non trapping mode in the configuration described by Michael et. al. When an orthogonal pulsing TOF geometry is used; ions exiting the multipole ion guide are pulsed into the TOF flight tube in an independent step. Multipole ion guides as configured in the invention can have higher trapping efficiencies than 3D traps and of significance in terms of performance, ions can be continuously entering the multipole ion guide even in ion storage and release operating mode. The incoming ion beam is generally turned off with 3D ion trap is mass scanning, collisionally cooling trapped ions, fragmenting ions or releasing ions from the trap. This reduces duty cycle and sensitivity with TOF mass analysis. All ions must be pulsed from the 3D ion trap into the TOF flight tube for mass analysis whereas only a portion of the ions need to be pulsed from a multipole ion guide for TOF analysis. Due to a significantly larger internal volume, an ion guide can trap a greater number of ions than a 3D ion trap. The 3D ion trap must have an internal pressure in the $10^{-3}$ torr range to increase ion trapping efficiency and to enable collisional cooling of the trapped ions. The trap is adjacent to the TOF flight tube which must be held at pressures below $10^{-6}$ torr to avoid ion collisions with the background gas during the flight time. As such, the 3D trap internal higher pressure region is incompatible with the low pressure flight tube requirements. A multipole ion guide which extends into more than one vacuum stage or a series of ion guides located in sequential vacuum stages have the advantage being able to deliver ions into a low pressure vacuum region before the ions enter the flight tube vacuum pumping stage.

The TOF mass analyzer has very different interfacing requirements that of a 3D trap mass analyzer. Douglas ('278) describes a multipole ion guide operated as with an API/3D ion trap mass analyzer where all ions trapped in the multipole ion guide are pulsed into 3D ion trap. The precise timing of the ion release pulse from the multipole ion guide into the 3D ion trap does fundamentally affect system performance in the instrument described. The timing, energy and shape of the ion pulse released from the multipole ion guide into the pulsing region of a TOF mass analyzer is critical to the mass spectrometer performance. Specific sequence control of the ion release function in a TOF analyzer provides improved duty cycle performance when compared 3D ion trap mass analyzer performance as will be described in more detail-below. Douglas ('278) describes performing trapping and a fragmentation step followed by full emptying of the ion guide into the 3D ion trap for mass analysis, a sequence which takes at least 0.12 seconds to perform. Unlike the 3D ion trap, the TOF mass analyzer conducts a mass analysis without scanning. Consequently, the TOF mass analyzer can perform large m/z range mass analysis at a rate greater than 20,000 times per second without compromising resolution or mass accuracy. The TOF can perform a large m/z range mass analysis a rate which is faster than the time it takes an ion to traverse the multipole ion guide length. A more diverse and a wider range of data acquisition functions can be performed to achieve MS/MS$^n$ analysis when using a TOF mass analyzer compared with other mass analyzer types. The present invention as described in more detail below, describes multipole ion guide TOF functions which not only provide MS/MS$^n$ analysis but can also include TOF mass analysis at each MS/MS step.

SUMMARY OF THE INVENTION

In accordance with the present invention, a linear multipole ion guide is incorporated into an Atmospheric Pressure Ionization Source TOF mass analyzer. The multipole ion guide can be operated in a manner which enables MS/MS$^n$ performance capability in an API/TOF mass analyzer. The multipole ion guide is configured to operate with m/z range selection, trapping and subsequent ion fragmentation using CID within the multipole ion guide. Parent ions and multiple generations of fragment ions formed within the ion guide are subsequently Time-Of-Flight mass analyzed. The multipole ion guide as configured in the invention is positioned between the API source and the TOF flight tube. In a preferred embodiment of the invention, a linear multipole ion guide is incorporated into a Time-Of-Flight mass analyzer apparatus. The multipole ion guide is located in the vacuum pumping stage or stages between the ion source, specifically downstream of the orifice into vacuum from an Atmospheric Pressure Ion (API) source, and the pulsing region of the TOF mass analyzer. The ion guide serves as an efficient means for transferring ions through one or more vacuum pumping stages between the API source free jet expansion and the TOF ion beam pulsing lenses. When transporting ions in a continuous beam, the multipole ion guide is usually operated in an RF only mode which allows the stable transport of a wide range of m/z values through the ion guide while holding the electrostatic entrance and exit lens potentials at a constant value to optimize focusing of the primary beam into the TOF pulsing region. In the present invention the multipole ion guide is operated in both a non trapping mode and in an ion storage or trap mode with ions pulsed from the ion guide into the TOF analyzer pulsing region. This pulsed ion extraction from the exit of the multipole ion guide can be selected to occur with or without interruption of the ion accumulation process within the multipole ion guide. The multipole ion guide operated in the ion storage or trap mode can be configured for delivering ions to either a collinear or an orthogonal pulsing TOF geometry where the ions are subsequently pulsed into the TOF mass analyzer flight tube.

The invention includes the operation of the multipole ion guide to selectively trap, fragment and transmit ions to the pulsing region of a TOF mass analyzer to achieve MS/MS$^n$ functionality in a TOF mass analyzer apparatus interfaced to an API source. The electrical voltages applied to the rods of the multipole ion guide including AC and DC components are adjustable such that a selected range of ion m/z values have stable trajectories within the ion guide electrical field. Electrostatic lenses are configured on the multipole ion guide entrance and exit ends such that voltages applied to these lenses allow either ion transmission through the multipole ion guide or trapping of ions within the ion guide. The relative electrostatic lens potentials upstream of the multipole ion guide can be set to transmit or cut off the primary ion beam to the ion guide as desired during ion guide trapping and CID steps. A specific m/z value or range of m/z values can be transmitted or trapped with the multipole ion guide by applying the appropriate AC and DC voltages on the multipole rods. This function will be referred to as m/z or mass selection. It is often preferable to perform m/z selection prior to an ion fragmentation step to allow definitive assignment of fragment ions to a specific parent ion. The invention includes the ability to conduct MS/MS analysis in an API/multipole on guide/TOF mass analyzer, where the multipole ion guide first performs a mass selection step and a subsequent fragmentation step. The resulting ion population is then released from the multipole ion guide into the TOF mass analyzer pulsing region from which the ions are mass analyzed when pulsed down the TOF flight tube. The multipole ion guide mass selection and ion fragmentation steps are achieved by applying a voltages to the multipole ion guide rods and the entrance and exit electrostatic lenses in a stepwise process. In one embodiment of the invention the ion beam is transmitted into the multipole ion guide which is operated in a mass selective trapping mode. When the multipole ion guide trap has been filled to the desired level, all or a portion of the ions in the linear multipole ion guide trap are fragmented using collisional induced dissociation. All or a portion of the trapped ions are then transmitted to the pulsing region of the TOF mass analyzer where they are accelerated into the TOF flight tube and m/z analyzed. The mass selection, trapping and CID steps can be repeated in sequence allowing MS/MS$^n$ functional capability with the ability to perform TOF mass analysis at one or more MS/MS steps. The ion fragmentation step can be performed in continuos transmission or trapping mode; with or without a mass selection step. Due to the rapid mass analysis capability of the TOF, the ion guide can be operated in a trapping and fragmentation step sequence without breaking the incoming ion stream.

The invention includes at least three methods to perform ion fragmentation with CID in the linear multipole ion guide. In addition, ion fragmentation can occur prior to the ion guide in the capillary to skimmer region. The first CID technique is to excite ions of selected m/z values in the ion guide with a resonant frequency applied to the ion guide poles superimposed on the multipole ion guide rod's AC and DC electrical components. The second CID method is to switch the voltages on the multipole ion guide exit lenses such that ions are released from the ion guide exit end, the ion potential is increased and ions are accelerated back into the ion guide to collide with neutral gas molecules present along the multipole ion guide length. The third method is to fill the multipole ion guide with ions to a critical level such that CID occurs with the trapped ions. All or a portion of the trapped parent and fragment ions can be released from the multipole ion guide and mass analyzed with a TOF mass analyzer. Each of the three CID methods requires that the neutral gas pressure at some point along the ion guide length be maintained high enough to cause collisional induced dissociation of ions within the ion guide.

In a preferred embodiment of the invention, a multipole ion guide extends into more than one vacuum pumping stage. The ion guide entrance is located just downstream of the skimmer orifice in a API source. The neutral gas pressure along the length of a multipole ion guide which extends through more than one vacuum pumping stage can vary by orders of magnitude with the region at the ion guide entrance having the highest pressure. This multipole ion guide geometry allows exposure of ions to higher pressures for kinetic energy cooling or CID fragmentation yet ions are delivered into a lower collision free vacuum pressure region upstream of the TOF pulsing region without compromising the low vacuum pressure requirements on the TOF flight tube. Also, the variable pressure along the ion guide length allows higher collisional energies to be attained for ions accelerated into the exit end of the ion guide than can be achieved with resonant frequency excitation. Consequently, a continuos range of low to high energy CID fragmentation of ions is possible with the invention.

DESCRIPTION OF THE INVENTION

Atmospheric Pressure Ion sources interfaced to mass analyzers include Electrospray, nebulizer assisted Electrospray, Atmospheric Pressure Chemical Ionization, Inductively Coupled Plasma (ICP) and Glow Discharge ion sources. Ions produced at or near atmospheric pressure by one of these ion source types are delivered to vacuum through a nozzle or capillary orifice along with the carrier gas which was present in the atmospheric pressure source chamber. The gas exiting the orifice into vacuum forms a free jet expansion in the first vacuum pumping stage. The vacuum stage partitions and ion optics downstream from the orifice into vacuum are designed to provide an efficient means of transporting ions into the mass analyzer with a minimum energy spread and angular divergence while neutral background gas is pumped away. One or more vacuum pumping stages have been used with various API/MS designs. Mass analyzers such as TOF require that flight tube operating pressures be in the low $10^{-6}$ to $10^{-7}$ torr range to avoid collisional scattering of ions as they traverse the flight tube. Typically API/TOF mass spectrometer instruments include three or more vacuum pumping stages to remove background gas exiting from the API source orifice into vacuum. Multipole ion guides have been used to transport ions emerging from an API source through individual vacuum stages into an orthogonal TOF mass analyzer (Whitehouse et. al). The present invention includes a multipole ion guide incorporated in either a coaxial or orthogonally pulsed API/TOF mass analyzer instrument. This multipole ion guide can be operated in either a mass filter, transmission, trapping or ion fragmentation mode to increase sensitivity and provide MS/MS$^n$ capability with TOF analyzers.

Figure 1:
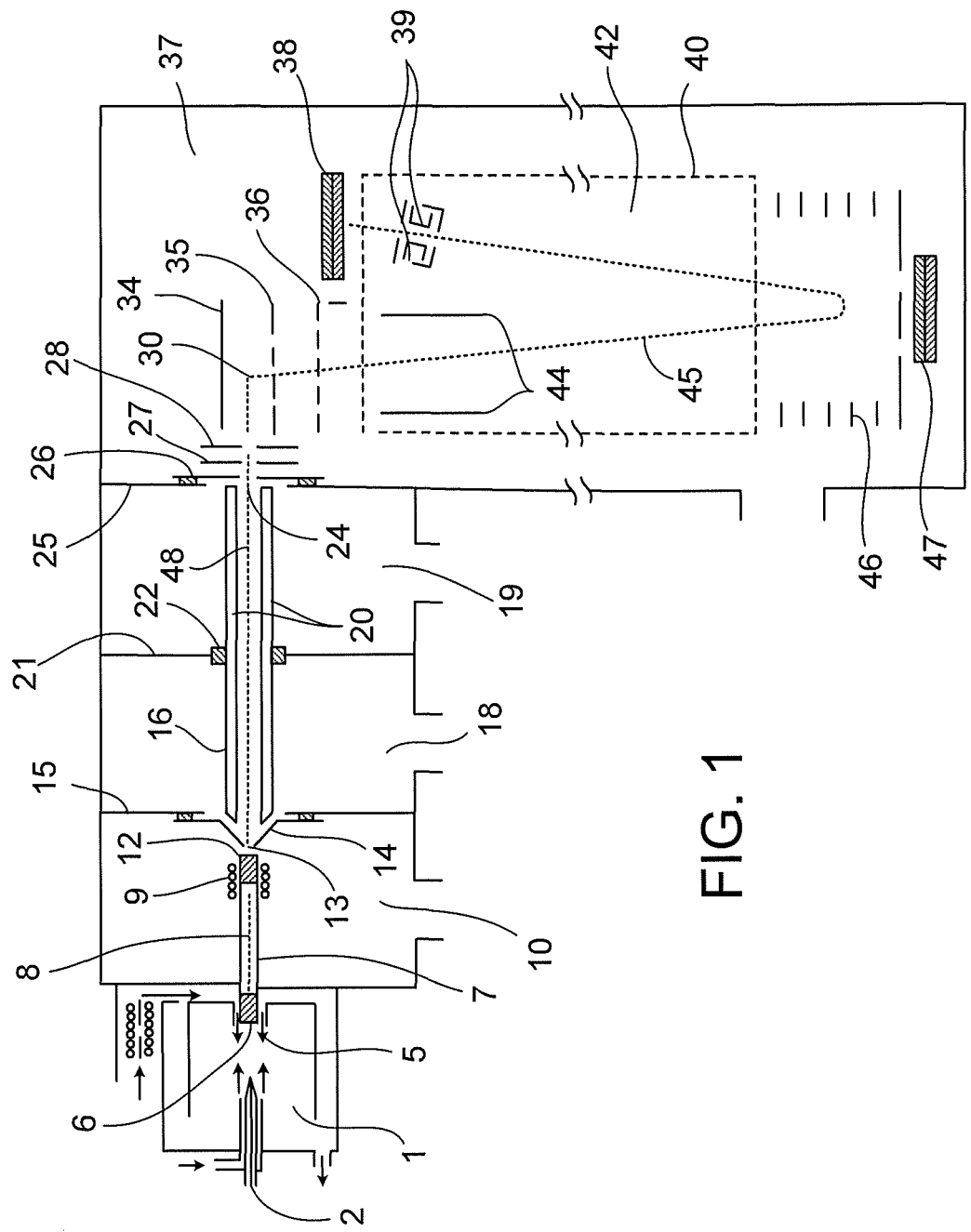
FIG. 1 is a diagram of a preferred embodiment of the invention with an Electrospray ion source, a multipole ion guide which extends into two vacuum pumping stages and a Time-Of-Flight mass analyzer with orthogonal pulsing and an ion reflector.

FIG. 1 illustrates a preferred embodiment of the invention where a multipole ion guide extends continuously through two vacuum pumping stages in an Electrospray TOF mass analyzer apparatus. In the embodiment shown, the TOF utilizes orthogonal pulsing of ions into the flight tube for mass, analysis. Charged droplets are formed by the Electrospray or nebulization assisted Electrospray process from the liquid sample introduced into the Electrospray ion source 1 through tube 2. The charged liquid droplets are driven towards capillary entrance 6 against a heated counter current drying gas 5 by the electrostatic fields in the Electrospray chamber. Ions are produced from the rapidly evaporating charged liquid droplets and a portion of these ions are enter capillary orifice 8 and are swept into vacuum. Nozzles have also been used in API sources as well to provide an orifice into vacuum. Capillary heater 9 is located along a portion the length of capillary 7 to heat the gas and ion mixture in capillary orifice 8 as it travels from atmospheric pressure into vacuum. The neutral carrier gas, usually nitrogen, forms a supersonic free jet expansion as it leaves capillary exit 12 and sweeps along the entrained ions. Voltages are applied to the conductive capillary exit 12 and skimmer 14 to focus ions through skimmer orifice 13 and into multipole ion guide 16. The relative voltage between capillary exit 12 and skimmer 14 can be set to maximize ion transmission through skimmer orifice 13 or can be increased to the point where collisional induced dissociation of ions traversing the gap between capillary exit 12 and skimmer opening 13 can occur. As the capillary to skimmer voltage is increased, ions are driven against the expanding neutral background gas increasing the internal energy of the ions. As will be described in a later section, increasing the internal energy of ions in the capillary skimmer region can be used to advantage when fragmenting ions within the ion guide using CID of ions with the background gas in the multipole ion guide.

Typically the first vacuum pumping stage 10 is evacuated with a rotary pump which maintains background pressure ranging from 0.5 to 4 torr. With the capillary exit 12 to skimmer orifice 13 distance set typically between 1 to 5 mm, a substantial neutral gas flux can pass through skimmer orifice 13 into second vacuum stage 18. Ions exiting skimmer orifice 13 enter the electric field of ion guide 16 still experiencing significant numbers of collisions with the neutral background gas. As the ions continue to drift through the length of ion guide 16, the neutral gas is pumped away and the number of collisions with the background gas diminishes. Multipole ion guide 16 with rods 20 extends continuously from vacuum stage 18 into vacuum stage 19. Multipole ion guide 16 is supported by electrical insulator 22 and partition 21 between vacuum stages 18 and 19. Multipole ion guide 16 can be a quadrupole, hexapole, octapole or can have higher numbers of rods. For the embodiment shown in FIG. 1, multipole ion guide 16 will be described as a quadrupole hexapole with radial dimensions small enough to minimize neutral gas conductance from vacuum stage 18 to vacuum stage 19. The $r_0$ for such a quadrupole assembly can be as small as 1.25 mm. Multiple vacuum pumping stage hexapoles have been commercially available from Analytica of Branford. Inc. with an $r_0$ of approximately 1.25 mm. Hexapole ion guides which extend through more than one vacuum stage have been fabricated with rod diameters of 1 mm inside rod spacing of less than 2.5 mm. Ions exiting multipole ion guide 16 at exit end 24 are focused by ion lenses 26, 27 and 28 into the orthogonal pulsing region 30 defined by electrostatic lenses 34 and 35. Ions in primary ion beam 48 are pulsed in an orthogonal direction into flight tube 42 through grids 35 and 36. Ion bunches pulsed through lenses or grids 35 and 36 traverse TOF flight tube 42 in vacuum stage 37. Different m/z values arrive separated in time at detector 38 in ion reflector operating mode. Alternatively ions of different m/z values will arrive at different times at detector 47 in a linear flight tube operating mode. Higher resolution can be achieved when ions accelerated from orthogonal pulsing region 30 are reflected through single stage reflector lens assembly 46 to detector 38. Two stage or gridless reflector assemblies can be used as well. Ion flight path 45 can be varied for tuning purposes by changing relative voltages on deflector lenses 44. Alternatively, pulsing the relative voltages across lenses 44 or 39 with the proper timing can selectively remove time separated m/z ions as the pulsed ion packet traverses flight tube 42. Electrically floating flight tube 42 inside electrode assembly 40 to accelerate ions to kilovolt potentials allows operation of ion guide 16 and pulsing region 30 lenses with voltages closer to ground potential. This lower voltage operation simplifies design and lowers the cost of the control circuitry for these elements.

Continuous Ion Beam Operation

Figure 9:
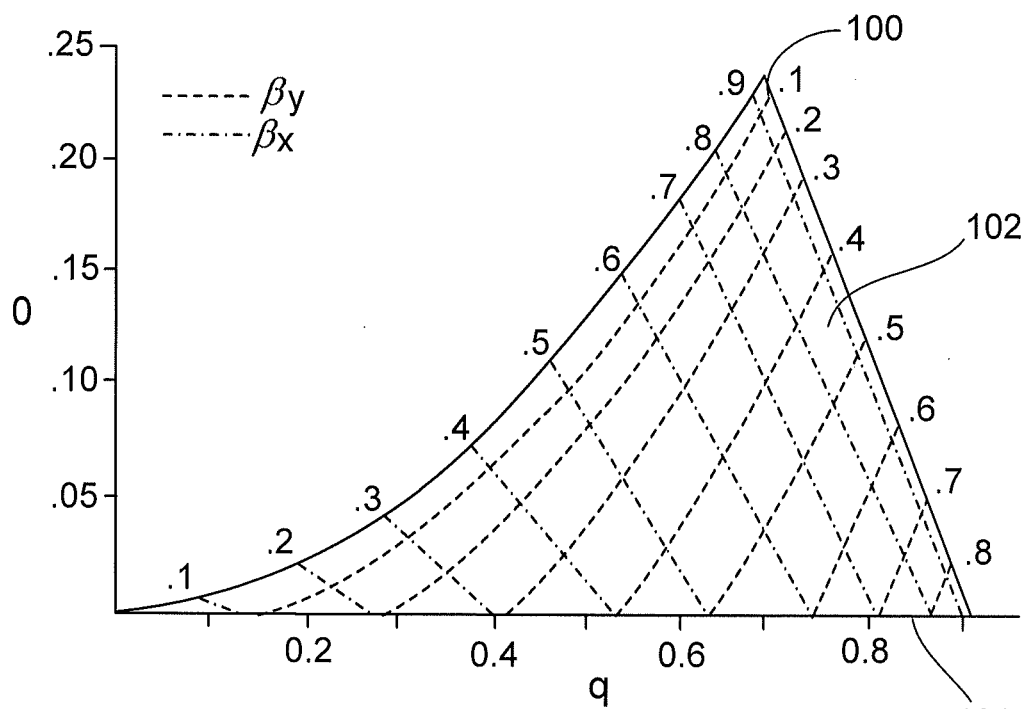
FIG. 9 is a Mathieu stability diagram near the origin for a quadrupole ion guide, showing the iso-$\beta$ contours.
Figure 10:
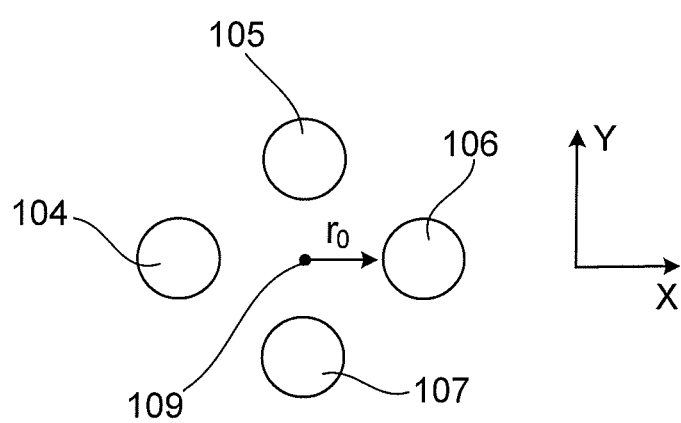
FIG. 10 is an end view of a quadrupole ion guide with round rods.

When the API/TOF instrument diagrammed in FIG. 1 is operated in a continuous beam mode, no break occurs in the ion beam between capillary exit 12 and pulsing region 30. In this mode ions continuously to enter ion guide 16. In one ion guide operating mode, the voltages applied to ion guide 16, a quadrupole in the preferred embodiment shown, are generally set to RF or AC only. This is equivalent to operating along a=0 line 101 of stability diagram 102 in FIG. 9. Ions enter traverse along the gap between lenses 34 and 35 when the relative voltage between lenses 34 and 35 is set at 0 V. Rapidly increasing the relative voltage between lenses 34 and 35 with the correct polarity accelerates ions in the gap down flight tube 42 for mass analysis. The relative voltage between lenses 34 and 35 is then returned to zero and ions traveling through lens 28 begin to refill the pulsing region gap 30 between lenses 34 and 35. The TOF duty cycle for a given value of m/z is determined by a combination of the pulse rate down the flight tube, the fill time of, pulsing region 30 and the ion flight time through the TOF flight tube 42. For example, if a flight time of m/z 5,000 is 100 μsec, then the maximum pulse rate would be 10 KHz to avoid the lower m/z ions of the next pulse from overtaking the heavier m/z ions of the first pulse in the TOF tube before the point of impact with detector 38 or 47. If the time for an ion of a given m/z value to fill the useable portion of pulsing region 30 is shorter than 100 μsec then a portion of these m/z value ions will travel past the pulsing region and be lost, reducing the duty cycle for that value of m/z. As examples; a 10 ev ion of m/z 5,000 will fill the pulsing region sweet spot in approximately 67 μsec and an of m/z 500 in approximately 12 μsec. Only a portion of the ions filling the gap between lenses 34 and 35 will actually make it into the flight tube when the voltages on lenses 34 and 35 are pulsed, the duty cycles for m/z ions 5,000 and 500 are 32% and 7% respectively. The m/z range of primary ion beam 48 can be reduced by setting AC and DC voltages amplitudes to establish the appropriate a and q values which will achieve stable trajectories on ions through the multipole ion guide for the desired m/z range. In this manner the pulse rate can be increased, improving duty cycle without overlapping high and low m/z ions in the TOF flight tube. Due to constraints imposed by circutiry, factors of only 2 to 4 can be gained by increasing the TOF rat; consequently, m/z 500 may only achieve a maximum duty cycle of 28% in continuous beam operating mode. Instead, trapping and the timed release of ions from the multipole ion guide is a preferred method for improving duty cycle.

Figure 2:
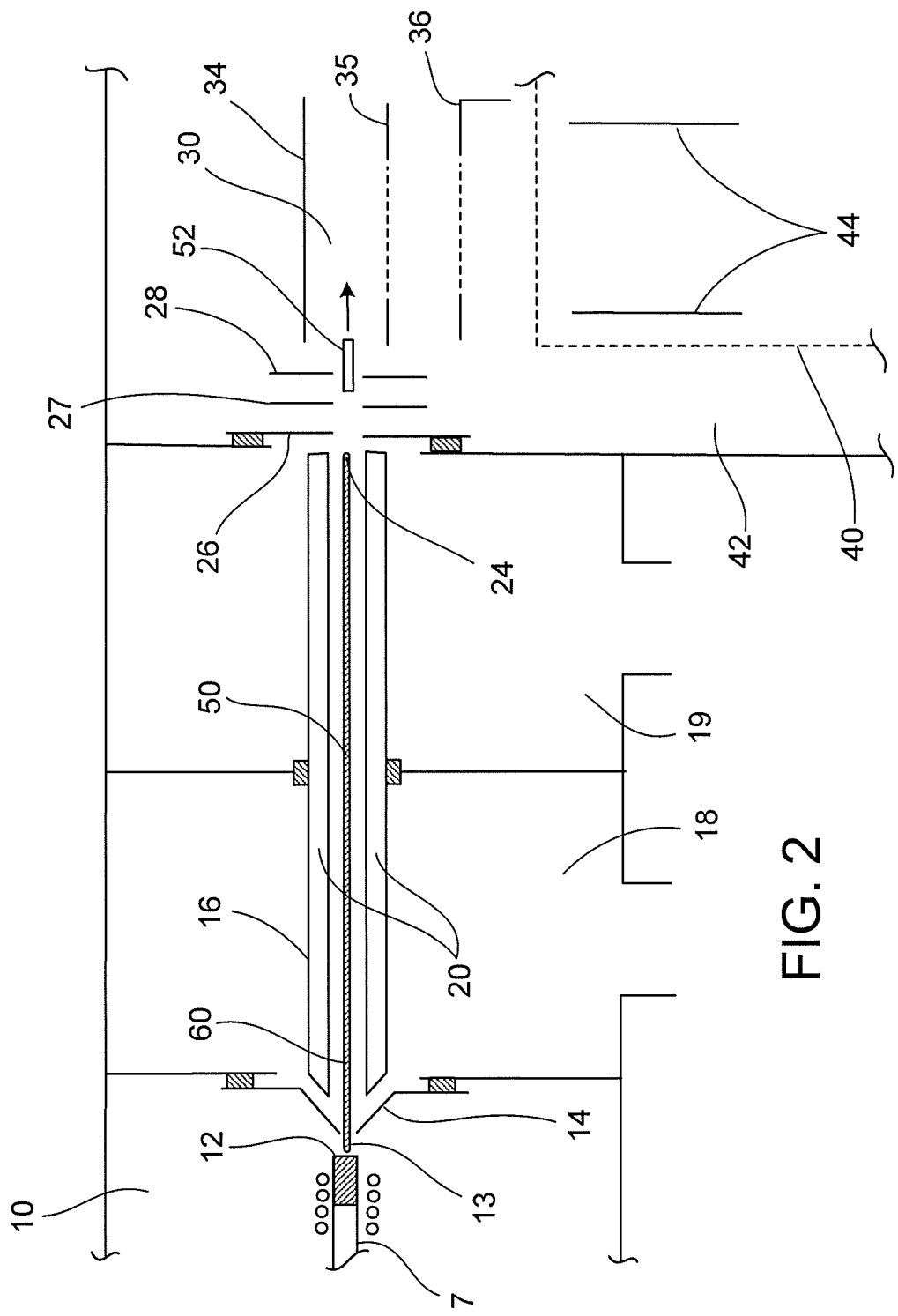
FIG. 2 is a diagram of the ion guide and TOF pulsing region of the preferred embodiment diagrammed in FIG. 1 where a pulse of ions has been released from the ions trapped in the multipole ion guide.

Trapping of ions in the multipole ion guide with subsequent release of ions into pulsing region 30 can be achieved by of two methods. Due to collisional cooling of ions with the neutral background gas particularly in the high pressure region at entrance region 60 of ion guide 16 shown in FIG. 2, the kinetic energy of ions traversing the ion guide is greatly reduced from the energy spread of ions which exit skimmer orifice 13. Typically the total ion energy spread for ions leaving ion guide 16 after a single pass is less than 1 ev over a wide range of m/z values. Due to this kinetic energy collisional damping, the average energy of ions in ion guide 16 becomes common DC offset potential applied equally to all ion guide rods 20. For example, if ion guide 16 has an offset potential of 10 ev relative to ground, then the ions exiting ion guide 16 at exit end 24 will have an average ion energy of approximately 10 ev relative to ground potential. FIG. 2 shows an enlargement of multipole ion guide 16 and pulsing region 30. The first and simplest way to trap ions in ion guide 16 is by raising the voltage applied to lens 26 high enough above the offset potential applied to ion guide 16 to insure that ions are unable to leave the ion guide RF field at exit end 24 and are reflected back along ion guide 16 towards entrance end 60. The voltage applied to skimmer 14 is set higher than the ion guide offset potential to accelerate and focus ions into the ion guide. Consequently, ions traveling back from exit end 24 towards entrance end 60 are rejected from leaving the exit end by the higher skimmer potential and the neutral gas stream flowing through skimmer orifice 13 into entrance end 60 of ion guide 16. In this manner, ions 50 with m/z values that fall within the ion guide stability window are trapped in ion guide 16. Ions are released from the ion guide by lowering the voltage on lens 26 for a short period of time and then raising the voltage to trap the remaining ions in ion guide 16. The disadvantage of this simple trapping and release sequence is that released ions that are still between lens 26 and 27 are accelerated to potentials higher that the average ion energy when the voltage on lens 26 is raised. These higher energy ions are effectively lost.

A second method to achieve more efficient trapping and release is to maintain the relative voltages between capillary exit 12, skimmer 14 and offset potential of ion guide 16 constant. With the relative voltages held constant, all three voltages are dropped relative to the lens 26 voltage to trap ions within ion guide 16. Capillary 7 as diagrammed in FIG. 1 is fabricated of a dielectric material and the entrance and exit potentials are independent as is described in U.S. Pat. No. 4,542,293. Consequently, the exit potential of capillary 7 can be changed without effecting the entrance voltage. In this manner, the ions which are released from ion guide 16 by simultaneously raising voltages on capillary exit 12, skimmer 14 and the offset potential of ion guide 16 and these ions pass through lens 26 retaining a small energy spread and remain optimally focused into pulsing region 30. After a short time period the three voltages are lowered to retain trapped ions within ion guide 16. A large portion of the released ions between lenses 26 and 27 are unaffected when the offset potential of ion guide 16 is lowered to trap ions remaining in the ion guide internal volume.

Figure 3:
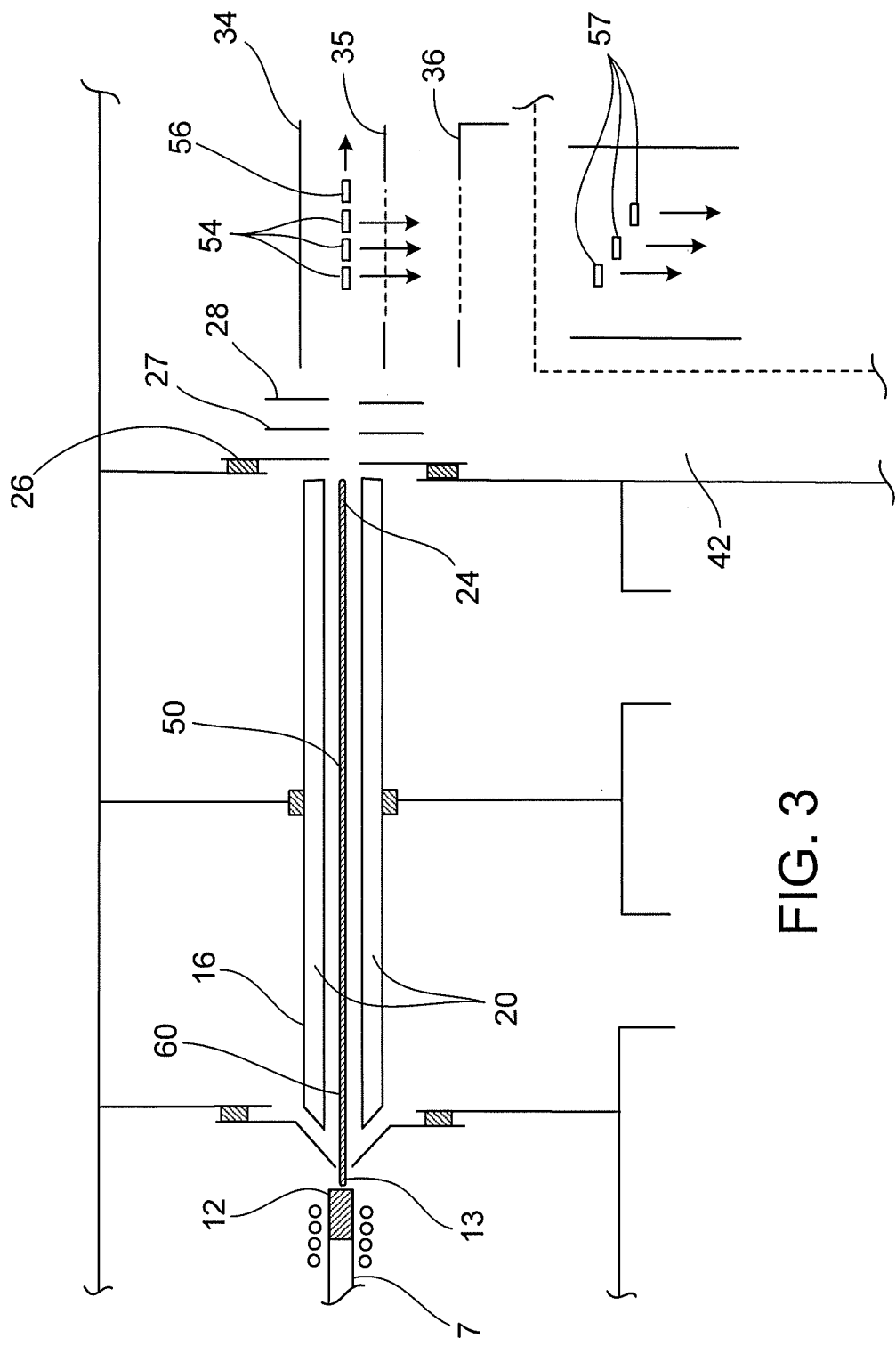
FIG. 3 is a diagram of the ion guide and TOF pulsing region of the preferred embodiment diagrammed in FIG. 1 where the ions which have traveled from the ion guide exit to the TOF pulsing region are orthogonally pulsed down the TOF flight tube.

By either trapping method, ions continuously enter ion guide 16 even while ion packets are being pulsed out exit end 24. The time duration of the ion release from ion guide exit 24 will create an ion packet 52 of a given length as diagrammed FIG. 2. As this ion packet moves through lenses 27 and into pulsing region 30 some m/z TOF partitioning can occur as diagrammed in FIG. 3. The m/z components of ion packet 52 can occupy different axial locations in pulsing region 30 such as separated ion packets 54 and 56 along the primary ion beam axis. Separation has occurred due to the velocity differences of ions of different m/z values having the same energy. The degree of m/z ion packet separation is to some degree a function of the initial pulse duration. The longer the time duration that ions are released from exit 24 of ion guide 16, the less m/z separation that will occur in pulsing region 30. All or a portion of ion packet 52 may fit into the sweet spot of pulsing region 30. Ions pulsed from the sweet spot in pulsing region 30 will impinge on the surface of detector 38. If desired, a reduced m/z range can be pulsed down flight tube 42 from pulsing region 30. This is accomplished by controlling the length of ion packet 52 and timing the release of ion packet 52 from ion guide 16 with the TOF pulse of lenses 34 and 35. A time separated m/z ion packet consisting of subpackets 54 and 56 just before the TOF ion pulse occurs is diagramed in FIG. 3. Ion subpacket 56 of lower m/z value has moved outside the sweetspot and will not hit the detector when accelerated down flight tube 42. Ion subpackets 57, originally subpackets 54, are shown just after the TOF ion pulse occurs. These subpackets will successfully impinge on detector 38. The longer the initial ion packet 52 the less mass range reduction can be achieved in pulsing region 30. With ion trapping in ion guide 16, high duty cycles can be achieved and some degree of m/z range control in TOF analysis can be achieved independent or complementary to mass range selection operation with ion guide 16. The ion fill level of multipole ion guide 16 operated in trapping mode is controlled by the ion fill rate, stable m/z range selected, the empty rate set by the ion guide ion release time per TOF pulse event and the TOF pulse repetition rate. During continuous ion guide filling, m/z selective CID fragmentation can be performed within ion guide 16, with high duty cycle TOF mass analysis.

CID Fragmentation with Continuous Ion Beam Operation

As was described in the above sections, a resonant frequency of low amplitude voltage can be added to the primary AC voltages applied to rods 20 of multipole ion guide 16. If the voltage amplitude of the applied resonant frequency applied is high enough, it will cause the m/z value with that resonant frequency in quadrupole 16 to be ejected radially from ion guide 16 before reaching exit end 24. This is one method of achieving ion guide/TOF m/z range selection in trapping or non trapping ion guide operation. If the same resonant frequency is applied with a reduced amplitude, selective m/z ion CID with the neutral background gas can be achieved for the selected m/z values as the ions pass through or are trapped in ion guide 16. Several ions may be present in the parent mass spectrum, however, only the ion with an m/z value which corresponds to the selected resonant frequency will undergo resonant frequency excitation CID fragmentation. The resulting fragment ions resulting from the parent ion resonant excitation CID can be identified by subtraction of a previously acquired mass spectrum with no CID fragmentation. As an example, say the TOF pulse repetition rate is 10 KHz and 1000 of the large mass range individual TOF mass spectra created per pulse will be added to form a summed mass spectrum. In this manner 10 summed mass spectra will be saved per second. During the 0.1 sec acquisition time of each even numbered summed mass spectrum, the resonant frequency which corresponds to say m/z of 850, the ion of interest, is added to the AC component applied to rods 20 of ion guide 16. The amplitude of this resonant frequency voltage component is high enough to cause CID fragmentation of m/z 850 due to ion collisions with the neutral background gas but not so high as to cause an unstable trajectory and hence the rejection of m/z 850 from the ion guide. The resonant frequency is then turned off for each odd numbered summed mass spectrum acquired. Each odd numbered mass spectrum can then be subtracted its following even numbered mass spectrum resulting in a subtracted spectrum containing the fragment ions resulting from the CID fragmentation and the difference in the parent peak height before and after fragmentation. This continuous beam CID fragmentation technique provides the equivalent information to a single MS/MS step with half the duty cycle of a non fragmentation experiment with or without ion guide 16 operated in trapping mode. In non trapping mod; this method of producing first generation ion fragments minimizes unwanted ion-ion or ion neutral reactions. Ions in non trapping mode take only a single pass through the ion guide minimizing the number of collisions which could potentially result in reaction species which produce unknown mass spectral peaks.

In a similar manner, a mass spectrum equivalent to an MS/MS$^2$ experiment step can be acquired. In such an MS/MS$^2$ experiment, the goal is to produce a mass spectrum of the second generation fragment ions resulting from CID fragmentation of a first generation fragment ion which itself has been produced by fragmentation of the parent. With conventional MS/MS operation, the analysis steps would include;

1. m/z selection of the parent ion in trap mode,
2. cause CID the fragmentation of the parent ion while trapping the fragment ions produced,
3. m/z selecting the first generation fragment ion of interest in the ion guide trap,
4. cause CID of the m/z selected first generation fragment ion and trap the resulting second generation fragment ions, and
5. produce a mass spectrum of the second generation fragment ions.

Similar MS/MS$^2$ results can be acquired using an extension of the technique described in the previous paragraph. In this case, ion guide 16 can be operated in either trapping or non trapping mode with continuous filling. If the cascade fragmentation process requires more time to complete than the time it takes for an ion to make a single pass through the ion guide higher pressure region then the ion guide 16 can be operated in trapping mode. Very high duty cycle can be maintained in ion guide trapping mode with lower TOF pulse repetition rates. Thus the trapped ions of interest have a longer residence time in the higher pressure region of ion guide 16 where CID can occur. To produce an MS/MS$^2$ mass spectrum, a set of two or three individual mass spectrum is acquired. In a set of three, the three individual mass spectra include one full parent ion spectrum, one mass spectrum resulting from the CID of the selected parent ion using resonant frequency excitation of the parent ion m/z value and one spectrum with simultaneous CID of the selected parent and first generation fragment ion using two frequencies of resonant excitation, one for each of the two m/z values. With this data set, a mass spectrum of the first generation fragments can be produced by subtracting the full parent mass spectrum from the single resonant frequency excitation CID mass spectrum as was described in the previous paragraph. A mass spectrum of the second generation fragments can be produced by subtracting the mass spectra acquired using the single resonant frequency excitation from the mass spectra acquired using the double resonant frequency excitation. If just the second generation fragment mass spectrum were desired, the acquisition of only two mass spectra would be required for subtraction and hence the duty cycle is only one half that of the optimal parent ion trapping mode of operation. If the fragmentation sequence is desired for MS/MS$^2$ acquisition then the duty cycle of the second generation fragment ion mass spectrum would be one third that of the optimal parent ion trapping mode of operation as three summed mass spectra would be acquired. Clearly this resonant frequency CID technique using a multipole ion guide with single or multiple resonant frequency CID fragmentation can be extended to perform high duty cycle MS/MS$^n$ analysis. Also several fragments ions of a given ion fragment generation could be selectively fragmented and recorded in successive mass spectra to acquire extensive ion fragmentation maps for a given parent ion species. The energy of the selective CID process can be controlled to some degree by adjusting the initial parent ion internal energy using the capillary to skimmer potential. The TOF pulse rate is so rapid that several MS/MS$^n$ experimental acquisition sequences can be acquired within a one second time frame. Thus one aspect of the invention enables the running of high sensitivity MS/MS$^n$ experiments on line with fast separation systems such as perfusion LC or CE even where chromatographic peak widths of less than one second are eluting.

CID Fragmentation with Interrupted Ion Beam Operation

In another aspect of the invention true mass selective MS/MS$^n$ experiments can be performed using ion guide 16 with TOF mass analysis. In this experimental sequence, the ion beam entering the ion guide 16 at entrance end 60 is interrupted during the CID fragmentation step or steps. The primary ion beam can be turned off by applying a repelling potential between capillary exit 12 and skimmer 14 which prevents ions exiting capillary 7 from entering skimmer orifice 13. With the embodiment of the invention as diagrammed in FIG. 1, an MS/MS experiment includes the steps of m/z selection and accumulation in ion guide 16 operating in trapping mode followed by an ion fragmentation step. Initially, in an MS/MS experiment, the primary ion beam is turned on and ions enter ion guide 16 which is operating in m/z selection mode. As described above, mass or m/z selection in ion guide 16 can achieved in a number of ways. One is by setting AC and DC voltage components on ion guide rods 20 resulting in operation near apex 100 stability diagram 102 in FIG. 9. A second method is by operating ion guide 16 along the a=0 line and applying resonant frequency rejection for all ions but the selected m/z value or values. A third method is to accumulate ions in RF only mode and by adjusting AC and DC amplitudes, scan out all but the m/z values of interest. When the multipole ion guide operating in trap mode has been filled to the desired level with the selected m/z range of ions, the primary ion beam is turned off preventing additional ions from entering ion guide 16 at entrance 60. Fragmentation of trapped ions in ion guide 16 can be achieved by, using one of at least three techniques. The first technique as was described above for continuous beam operation is to apply a resonant frequency to rods 20 of ion guide 16 to cause resonant excitation of all or a portion of the trapped ions. The resonant excitation results in fragmentation due to CID of the translationally excited ions with the background gas in ion guide 16.

A second technique and another aspect of the invention allows higher energy fragmentation to occur than can be achieved with resonant frequency CID. This second ion fragmentation technique is realized by switching the offset potential of ion guide 16 and the voltage applied to lens 26 to release ions trapped in ion guide 16 and accelerating them at higher energy back into exit end 24. A short release pulse is used such that ions leaving ion guide exit 24 move to fill the gap between lenses 26 and 27. When the gap between lenses 26 and 27 is filled, the voltages on lenses 26 and 27 are rapidly increased effectively changing the energy of ions in the gap between the end of rods 20 and lens 27. The relative voltages on the lenses 26 and 27 and the offset potential of ion guide 20 are set such that the ions sitting at a raised potential are accelerated back into the exit end 24 of ion guide 16 and travel from ion guide exit end 24 toward ion guide entrance end 60 through the length of the internal volume of ion guide 16 colliding with neutral background molecules in a portion of the ion guide length. The ion traversing ion guide 16 in the reverse direction are prevented from leaving entrance end 60 of ion guide 16 by setting the appropriate retarding potential on skimmer 14. During this step where ions are accelerated back into ion guide exit 24, the ion guide offset potential and the voltage on lens 26 are set such that ions within the ion guide remain trapped. One advantage of the multiple vacuum stage configuration of ion guide 16 is that ions are initially reverse accelerated back into exit end 24 of ion guide 16 in a low pressure region with initially no ion collisions occurring with the background gas. Consequently, the ions can achieve higher velocities resulting in higher energy collisions when they encounter the higher pressure background gas closer to ion guide entrance 60. This ion reverse direction acceleration step can be repeated a few or several times to fragment a portion or all of the parent ions trapped in the ion guide. This repetitive reverse direction acceleration step can also cause additional fragmentation of fragment ions provided the collision energies are sufficient. After sufficient ion fragmentation has occurred by this method, a series of TOF mass spectra can be acquired of the ion population trapped in ion guide 16. As was described in an earlier section, releasing of trapped ions from ion guide 16 for TOF mass analysis followed by trapping of the ions remaining in ion guide 16, can be achieved either by changing the voltages on just lens 26 or conversely, the ion guide offset potential, skimmer 14 voltage and the voltage on capillary exit 12 can be stepped together.

Resonant frequency excitation of selected m/z values will can cause fragmentation of those selected m/z values without causing fragmentation of unselected m/z values. The reverse direction acceleration ion fragmentation technique as described in the previous paragraph is not m/z selective and can cause fragmentation of any ion species which will fragment at the CID energy achieved in the reverse direction ion acceleration. The ion collisional energy in this reverse direction acceleration technique, however, can be finely controlled by the relative voltages set on lenses 26 and 27 and the offset potential of ion guide 16 during ion acceleration into exit end 24 of ion guide 16. A third technique to fragment ions trapped in multipole ion guide 16 is another aspect of the invention. It was found that when ion guide 16 is filling with ions, a point is reached where fragmentation of the parent ion occurs. TOF mass spectra illustrating this ion CID technique are shown in FIG. 8 for Leucine Enkephalin with a molecular weight of 556 for the protonated ion, TOF mass spectra were acquired using a TOF which included a collinear pulsing region as diagrammed in FIGS. 6 and 7 and a multipole ion guide operated in ion trapping mode. Mass spectrum 80 was acquired with a capillary to skimmer relative voltage of 97 volts and an ion guide fill time of 0.5 seconds before the primary ion beam was cut off and the TOF mass spectrum was acquired. No appreciable fragmentation was observed with these conditions even if ions remained trapped for some time before releasing a series of ion packets to acquire TOF mass spectra. Prior to the acquisition of TOF mass spectrum 82, the ion guide fill time was increased to 1.65 seconds retaining the capillary to skimmer relative voltage at 97 volts. As can be seen from the acquired TOF mass spectrum 82, fragmentation of the protonated Leucine Enkephalin ion has occurred. Raising the capillary to skimmer potential increases the internal energy of the ions entering the ion guide. With higher relative capillary to skimmer voltage applied, less additional energy is then required to fragment the more highly energetic Leucine Enkephalin parent ions in the ion guide. This is observed in TOF mass spectrum 81 where the relative capillary to skimmer potential was increased to 187 volts and fragmentation of the Leucine Enkephalin ion occurred at only 0.5 seconds of ion guide fill time.

The precise mechanism of this fragmentation process is not completely understood but evidence from related experiments suggests that reverse direction ion acceleration into ion guide exit end 63 as was described in the previous paragraph may play a role. It was found that as the ion guide fills with ions, the space charge repulsion of ions trapped within ion guide 60 caused a portion of the ions trapped within ion guide 60 to bulge into the gap between exit end 63 and lens 64. For the data acquired in FIG. 8, the ion guide offset potential was set at 10 ev and the trapping potential applied to ion guide exit lens 64 was positive 40 volts. Thus, ions which are bulging into the gap between ion guide exit 63 and lens 64 have a potential which falls between 10 and 40 ev. These higher energy ions are accelerated back into ion guide exit 63 and traverse the length of ion guide 60 where they collide with neutral gas background molecules within ion guide 60. Parent ion fragmentation does not occur until the energy of collision is sufficiently high to break the weakest bond. As ion guide 60 fills with ions, increased space charge bulges the ions further out into the increasingly higher electrostatic fields in the gap between ion guide exit 63 and lens 64. Due to this effect, ions accelerated back into ion guide 60 through exit 63 have increasing energy as the ion guide fills. It is not yet certain what role the ion guide fringing fields play in the ion fragmentation process resulting from filling ion guide 60. It should be noted that each TOF mass spectrum 80, 81 and 82 shown in FIG. 8 is the summation of 5 individual TOF mass spectrum. The ion release from ion guide 60, was achieved by rapidly lowering the potential on lens 64 to minus 40 volts. The voltage on lens 64 was dropped from plus 40 to minus 40 volts in less than 50 nanoseconds, held at minus 40 volts for 5 μsec, then returned to plus 40 volts with a rise time of less than 50 nanoseconds. The signal ringing 85 in the mass spectra of FIG. 8 is from the falling edge of the lens 64 voltage pulse and the ringing at point 86 is caused by the rising edge. Both of these ringing events occur before the lowest m/z ions hit detector 71 so the mass spectrum is not effected by this electronic related noise. A point to note is that the total ion release time from ion guide 60 is 5 μsec for each individual TOF spectra acquisition. Five individual TOF mass spectra were summed to produce each mass spectra shown in FIG. 8. Hence a total of 25 μsec of ion guide trap empty time was required to produce each parent and first generation fragment ion mass spectra 80, 81 and 82 respectively. Similar, ion signal levels were obtained for ions trapped in ion guide 60 over an ion release period exceeding 200 μsec. Consequently, several summed TOF mass spectra can be produced from one set of ions trapped in ion guide 60. The ion guide can trap ions with little or no loss over a time period of several minutes.

The ability to acquire summed mass spectra from only a portion of the ions trapped within ion guide 60 or ion guide 16 creates the ability to acquire TOF mass spectra data for several experiments using the same set of ions. One application for this capability would be to capture fast events occurring from an on line separation system. If a peak eluted from an on line CE column in less than 0.5 seconds, the Electrospray generated ions resulting from the sample eluting in the peak could be captured by trapping them in ion guide 16. After capturing sample related ions generated from the CE peak, the primary ion beam could be turned off and several experiments could be run on the ion set either under preset instrument control or by user selected functions. A series of experiments run on a trapped set of ions could be as follows. A summed TOF mass spectra is first acquired to record the parent ions present. From the data acquired, the user selects a parent m/z of interest and fragments this ion by selective resonant frequency excitation. A summed TOF mass spectrum is acquired and it is subtracted from the first mass spectrum to obtain a fragment ion mass spectrum. A second parent ion m/z value is selected using the first mass spectrum and fragmentation is achieved through selected resonant frequency excitation of the second parent ion m/z. The resulting third summed mass spectra is subtracted from the second to obtain the set of fragment ions which resulted from the second parent ion. The fourth experiment might be to clear the trap of all but one m/z by resonant ejection and fragment the remaining trapped ions using high energy CID using the technique described above where ions are reverse direction accelerated back into ion guide exit 24. An MS/MS$^2$ experiment can then be run on a resulting high energy CID fragment. As this example illustrates, many types and combinations of experiments can be run on a single set of trapped ions with multiple TOF spectra generated. If a series of experiments were preset and repetitive, several experiments could be conducted on each ion set trapped automatically during an on line separation or with multiple samples run in a repetitive flow injection analysis. Due to the rapid acquisition capability of the TOF mass analyzer, a complex sequence of experiments can be run and several TOF mass spectra recorded for a set of trapped ions in a time period of less than one second. By adding a selected reactant gas into vacuum stages 18 or 19 in FIG. 1, gas phase reactions with trapped ions can be studied as well with the techniques described above. For example, the substitution of deuterium for hydrogen in trapped protonated ions of proteins to study the gas phase folding structure can be monitored in this manner.

An MS/MS experiment using the apparatus as diagrammed on FIG. 1 can have several variations as described in the above sections due to the optional techniques available to achieve each functional step. When operating where the primary ion beam is shut off between ion guide filling cycles, a typical MS/MS experimental may include the following sequence of steps;
1. The primary ion beam is turned on and ions fill the ion guide which is operated in ion selection trapping mode,
2. After a period of trap fill time, the beam is shut off,
3. The ion guide rod voltages are set for wide m/z range trapping mode operation,
4. A TOF mass spectrum is acquired of the trapped parent ion from a portion of the ions trapped in the ion guide,
5. Fragment ions are produced in the ion guide trap from the remaining trapped parent ions,
6. One or more TOF mass spectra are acquired of the resulting trapped ions.
7. The ion guide is emptied of all remaining ions,
8. Steps 1 through 7 are repeated.

Step four can be eliminated in the sequence given above if rapid MS/MS TOF acquisition is required. A widely used MS/MS triple quadrupole experiment termed neutral loss or multiple reaction monitoring (MRM) is accomplished by scanning quadrupole three simultaneously with quadrupole one maintaining a set m/z offset between the two quadrupoles. Ions passing through quadrupole one are fragmented by CID in quadrupole two. Any fragment ion with the preset m/z offset from the parent ion m/z will pass through quadrupole three and be recorded. Emulation of a triple quadrupole neutral loss or MRM experiment can be achieved with the API TOF configuration as diagrammed in FIG. 1 operated in MS/MS mode. An example will be used to describe this capability. Say a triple quadrupole MRM scan is taken over a parent ion mass range from 200 to 1,000 m/z in two seconds. To maximize sensitivity and include parent isotope peaks, quadrupole one passes an m/z window of four m/z throughout its scan. To emulate this triple quadrupole function, the API/multipole ion guide/TOF is operated in the following manner. The ion guide is operated in mass selective non continuous ion beam trapping MS/MS mode where a four m/z stability window is selected. Each individual TOF mass spectrum is acquired at a rate of 1,000 Hertz with every ten individual TOF mass spectra added to produce a saved TOF mass spectra. In this manner 100 added TOF mass spectra will be saved per second. Two trap fill MS/MS cycles are performed per added mass spectrum with 5 individual TOF mass spectrum acquired from each MS/MS cycle. After every ten individual TOF mass spectra or one added mass spectra, are acquired, the selected trapped m/z range is shifted up by four m/z. In this manner 100 MS/MS experiments are conducted over a 400 m/z range in a 4 m/z per MS/MS cycle stepwise fashion. An 800 m/z range can be covered in 2 seconds emulating the triple quadrupole MRM example given above. The resulting TOF data set is not restricted to just a single scan of a selected offset ion as in the triple quadruple case but contains 200 full mass spectra of all the fragment ions produced per m/z window trapped. The triple quadrupole MRM experiment is only one specific selected ion chromatogram extracted from 200 TOF mass spectra. With the emulated TOF MRM acquisition far more analytically useful information is available than is the case with the triple quadrupole acquisition. An analogous MRM simulated experiment can be performed by the API TOF instrument in the continuous ion beam operating mode as well with or without trapping.

The sequence described in the previous paragraph is one example of how the MS/MS$^n$ API TOF capability as described in the invention can be utilized either on line with a separation system or when analyzing limited sample amounts. The API TOF instrument can be set up to acquire mass spectral data while rapidly performing a complex sequence of MS/MS$^n$ experiments. In this manner a large data set is acquired using very little sample. A range of simulated experiments can then be run on the data set only by grouping or extracting various portions of the acquired data set without consuming additional sample.

An MS/MS$^2$ experiment can be run with the apparatus diagrammed in FIG. 1 by extending the number of steps used in the MS/MS experiment as follows;
1. The primary ion beam is turned on and ions fill the ion guide which is operated in ion selection trapping mode,
2. After a period of trap fill time, the beam is shut off,
3. The ion guide rod voltages are set for wide m/z range trapping mode operation,
4. Fragment ions are produced in the ion guide trap from the remaining trapped parent ions,
5. A second m/z range of ions is selected which includes a first generation fragment ion and all ions not in the selected m/z value range are rejected from the ion guide,
6. The ion guide rod voltages are reset for a wide m/z range trapping mode operation,
7. Fragment ions are produced in the ion guide trap from the remaining first generation fragment ions,
8. One or more TOF mass spectra are acquired from the resulting trapped ions,
9. After TOF acquisition, the ion guide is emptied of all remaining ions,
10. Steps 1 through 10 are repeated.

MS/MS$^n$ experiments can be run by repeating steps 5, 6 and 7 as described in the MS/MS$^2$ sequence above for higher generation fragment ions for the desired number times to create the desired n generation fragment ions. TOF mass spectra may be acquired after one or more selected fragmentation steps in an MS/MS" experiment using only a portion of ions trapped in ion guide 16. Several variations in sequencing functional steps to achieve MS/MS" analytical capability are possible in addition to those described above.

Alternative embodiments of the invention are diagrammed in FIGS. 4, 5, 6 and 7. The ion guide and TOF pulsing region of a four vacuum stage API orthogonal pulsing TOF mass analyzer is diagrammed in FIG. 4. The multiple vacuum pumping stage ion guide shown in FIG. 1 has been replaced by two multipole ion guides each of which begins and ends within one vacuum pumping stage. Multipole ion guide 110 is located entirely in the second vacuum pumping stage 112. A second multipole ion guide 111 is located entirely in the third vacuum pumping stage 113. Electrostatic lens 114 positioned between ion guides 110 and 111 serves as a vacuum stage partition between vacuum stages 112 and 113 and as an electrostatic ion optic element separating ion guides 110 and 111. Ions produced in an API source enter the first vacuum stage 117 through capillary exit 116. A portion of these ions continue through skimmer orifice 118 and enter multipole ion guide 110. Operating in single pass continuous beam mode, ions pass through ion guide 110, lens orifice 115, ion guide 111 and into TOF orthogonal pulsing region 120 where they are pulsed into TOF tube 123 and mass analyzed. Ion guide 110 operates in a background pressure typically maintained between $5\times10^{-4}$ and $1\times10^{-2}$ torr. Ion guide 111 operates in a background pressure maintained typically below $1\times10^{-3}$ torr. Ion transfer between ion guides 110 and 11 and electrostatic lens 114 may not be as efficient as that achieved with a multiple vacuum stage multipole ion guide as shown in FIG. 1 but some similar MS/MS" functional capability can be achieved with the embodiment diagrammed in FIG. 4. In the configuration shown in FIG. 4 ion guide 110 can be operated in trapping mode. Due to the higher pressure in ion guide 110 and using techniques such as resonant frequency excitation, ion fragmentation can occur due to CID of ions with the neutral background gas within ion guide 110. Voltages can be applied independently to ion guides 110 and 111, so both ion guides can be operated in variety of trapping or transmission modes with different offset potentials or m/z selection. This operational flexibility allows some variation in functional step sequences in acquiring MS/MS" data from those described for the embodiment illustrated in FIG. 1.

Figure 4:
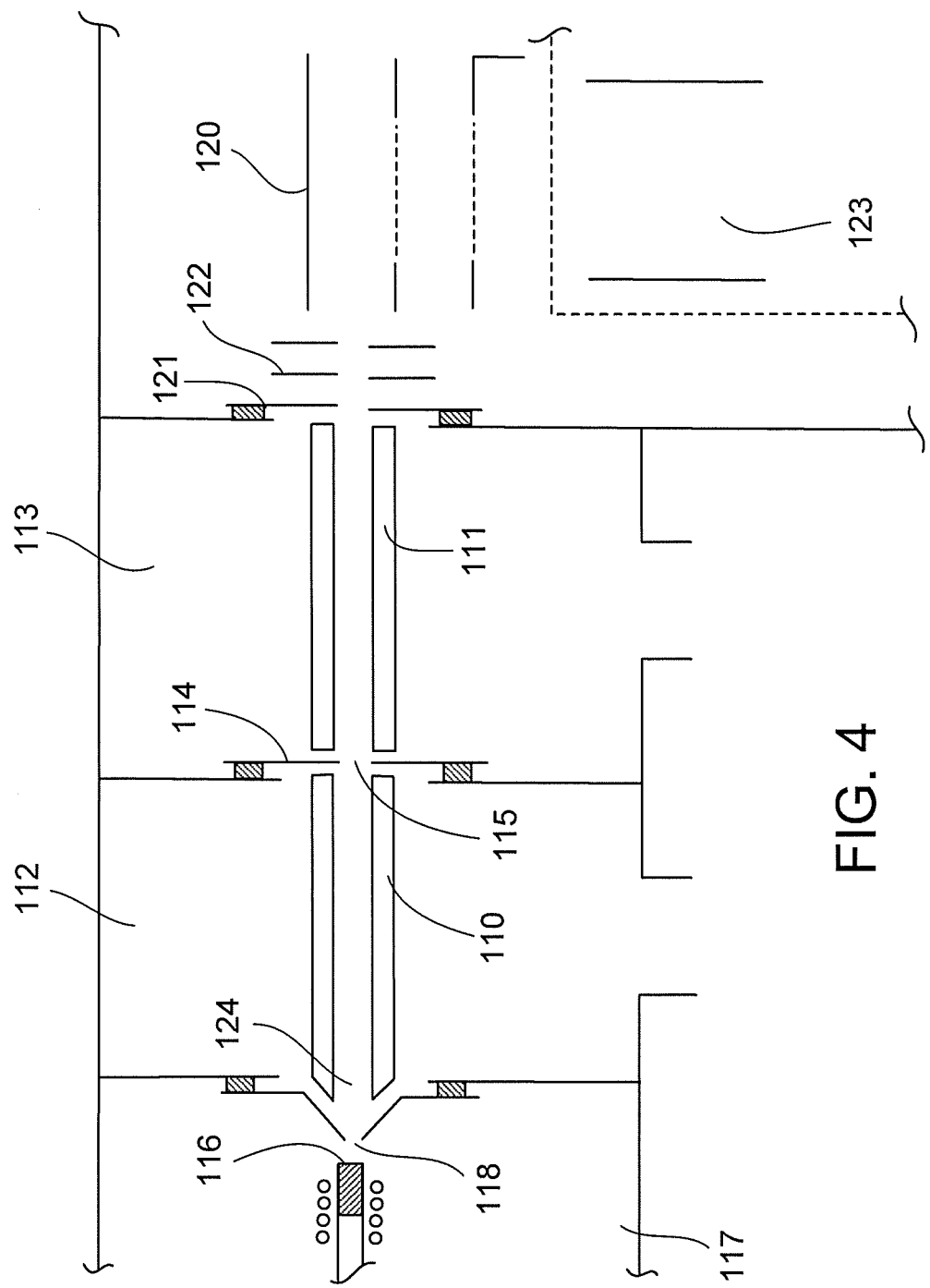
FIG. 4 is a diagram of a second embodiment of the invention which includes two multipole ion guides each located in adjacent vacuum pumping stages in an API orthogonal pulsing TOF mass analyzer.

For example, a variation can be used with the embodiment shown in FIG. 4 to achieve the equivalent capability as was described with the reverse direction acceleration ion fragmentation technique described for the apparatus diagrammed in FIG. 1. With the two ion guide configuration shown in FIG. 4, ion guide 110 can be operated in a wide m/z range trapping mode and ion guide 111 in a m/z selective trapping mode. The trapped ions in ion guide 111 can be accelerated back into ion guide 110 through lens orifice 115 by increasing the offset voltage of ion guide 111 relative to the offset potential of ion guide 110. Ions traversing ion guide 110 moving in the reverse direction towards entrance end 124, collide with neutral background molecules. In this manner m/z selective ion fragmentation with higher energy CID can be achieved. A second example of a function variation using the embodiment shown in FIG. 4 creates the ability to perform selected ion-ion reaction monitoring. To perform this analysis, both ion guides are operated in trapping mode with different m/z range selection chosen for each ion guide. A fragmentation experiment can be run in ion guide 110 without changing the ion population in ion guide 111. The different ion populations from both in guides can then be recombined by acceleration of ions from one ion guide into the other to check for ion reactions before acquiring TOF mass spectra of the mixed ion population. The ion guide m/z selection and ion fragmentation techniques described in previous sections can be applied to multipole ion guide embodiment shown in FIG. 4 to achieve most of the equivalent and even some additional MS/MS" analysis performance capability.

Figure 5:
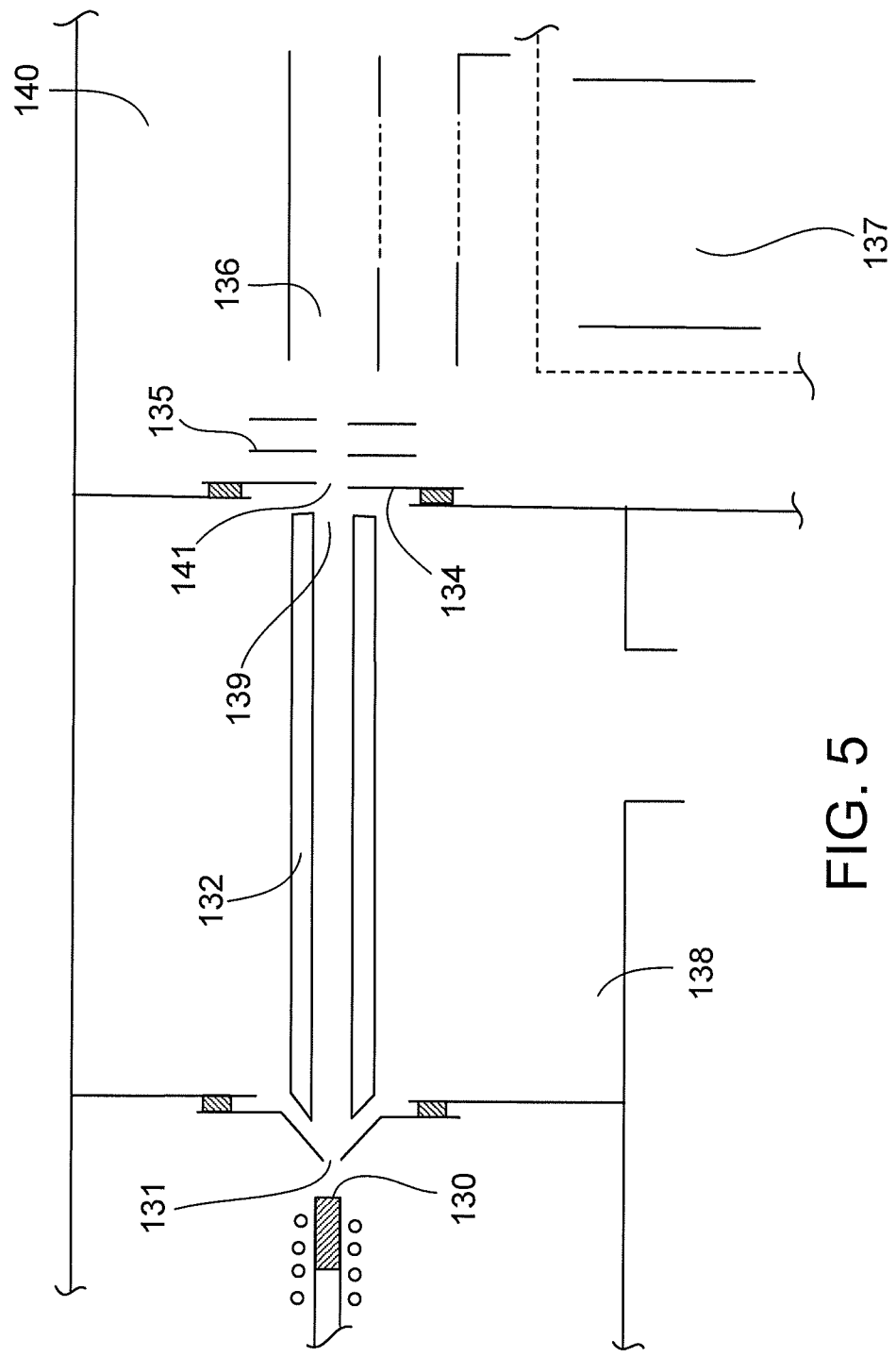
FIG. 5 is a diagram of a third embodiment of the invention where an API TOF mass analyzer with orthogonal pulsing includes a multipole ion guide located the second vacuum pumping stage of a three pumping stage system.

Another embodiment of the invention is shown in FIG. 5 which is a diagram of the multipole ion guide and orthogonal TOF pulsing region of a three vacuum pumping stage API TOF mass analyzer. In this embodiment, a portion of the ions exiting capillary exit 130 are focused through skimmer orifice 131 and enter multipole ion guide 132. The pressure in the second vacuum pumping stage 138 is maintained at a level where ion fragmentation by CID with the background gas is possible using the ion fragmentation techniques described in the previous sections. Generally this will require a background pressure in vacuum stage 138 higher than $5\times10^{-4}$ torr. With the apparatus diagrammed in FIG. 5, MS/MS" functional capability as described above for the apparatus diagrammed in FIG. 1 can be realized. However, the higher background pressure found at exit end 139 of ion guide 132 may not be optimal to achieve collision free ion focusing and beam shaping through lenses 134 and 135 and into TOF pulsing region 136. Depending on the background pressure level, the higher pressure at ion guide exit lens 139 may also effect the performance of the ion fragmentation technique which uses ion acceleration back into ion guide exit 139 to achieve ion CID in ion guide 132. One disadvantage to using the apparatus diagrammed in FIG. 5 is that as the background pressure in vacuum stage 138 is increased to achieve more efficient CID in ion guide 132, it becomes increasingly difficult to maintain low vacuum pressure in the TOF tube 137. The pressure in vacuum stage 140 can be reduced by increasing the vacuum pumping speed but this increases vacuum pump cost and potentially increases the instrument size. The neutral gas conductance between the second and third vacuum stages 138 and 140 respectively can be reduced by decreasing the size of orifice 141 in lens 134. However, reducing the size of orifice 141 may have the negative effect of reducing the ion transmission through lenses 134 and 135 leading to TOF orthogonal pulsing region 136. One advantage to the three vacuum pumping stage configuration shown in FIG. 5 is that potentially fewer vacuum stages results in lower instrument cost.

Figure 6:
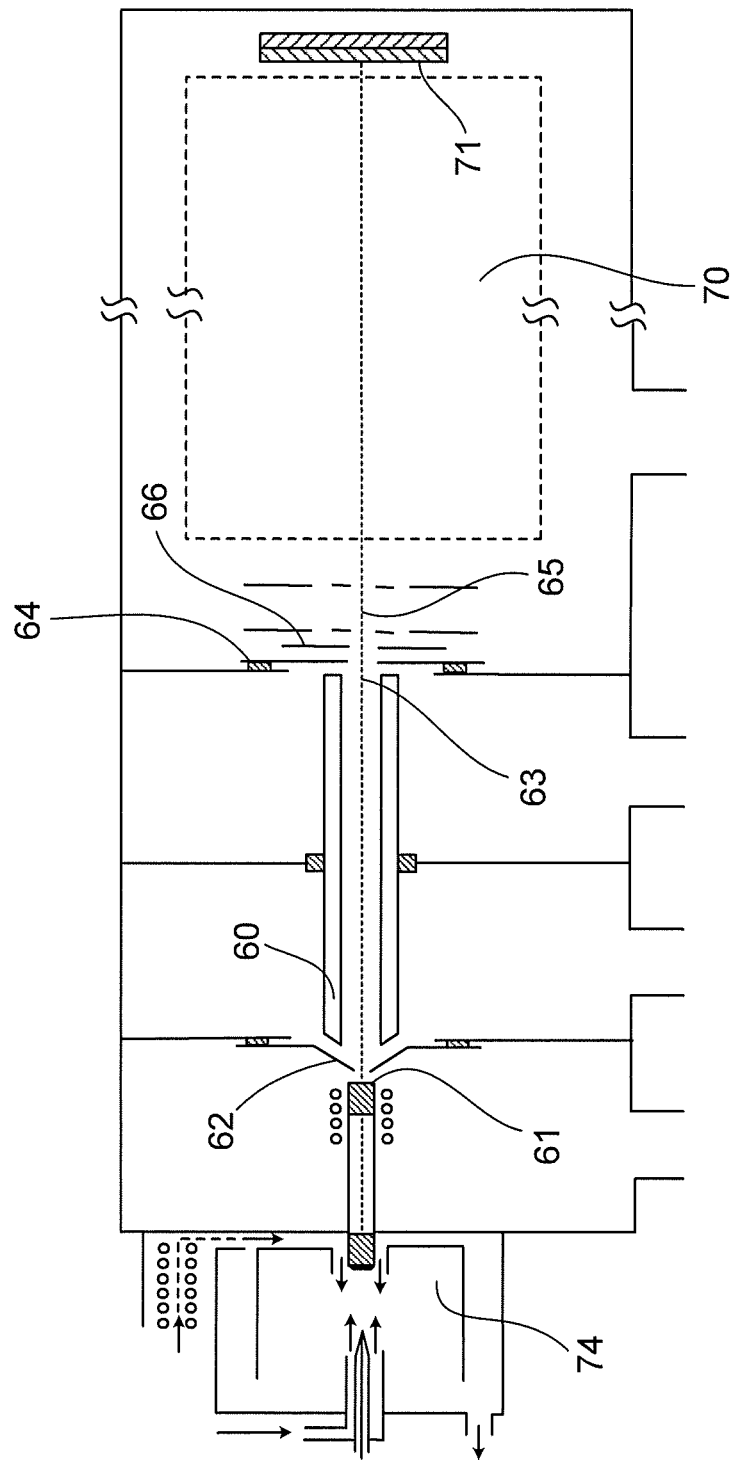
FIG. 6 is a diagram of a fourth embodiment of the invention which includes an Electrospray ion source, a multipole ion guide which extends into two vacuum pumping stages and a Time-Of-Flight mass analyzer with a collinear pulsing geometry and a linear flight tube.
Figure 7:
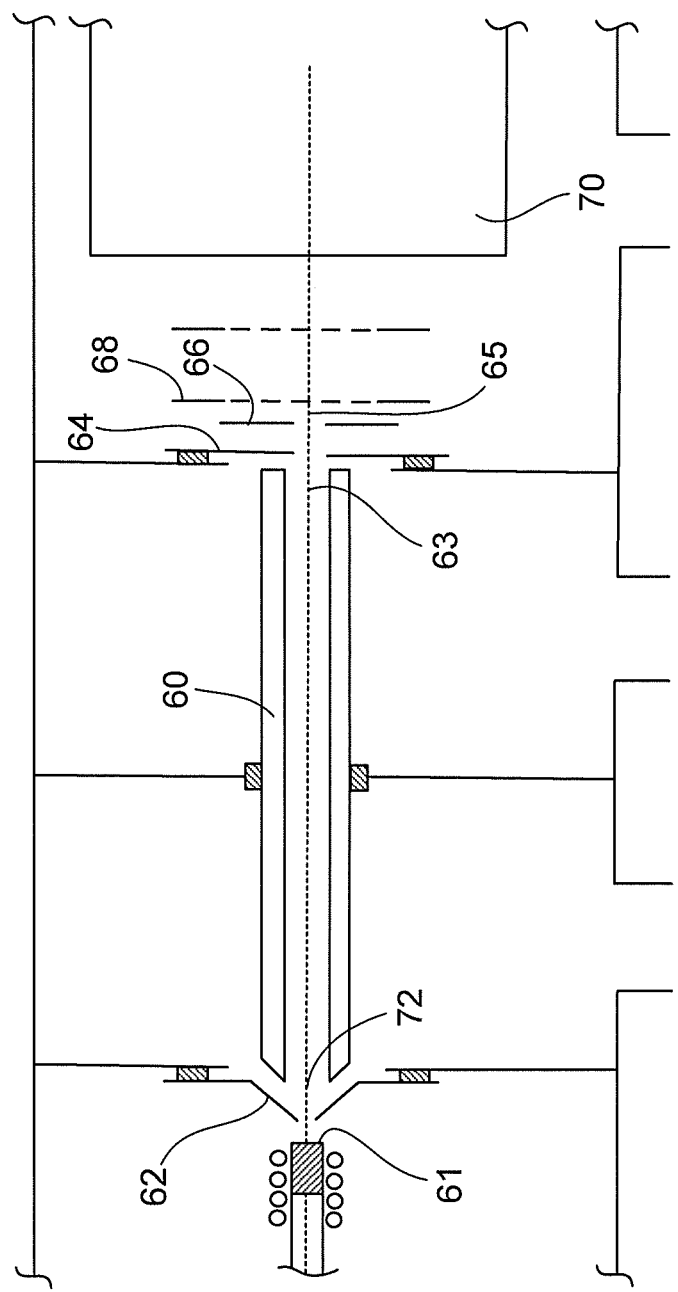
FIG. 7 is a diagram of the ion guide and TOF pulsing region of the embodiment diagrammed in FIG. 6.
Figure 8:
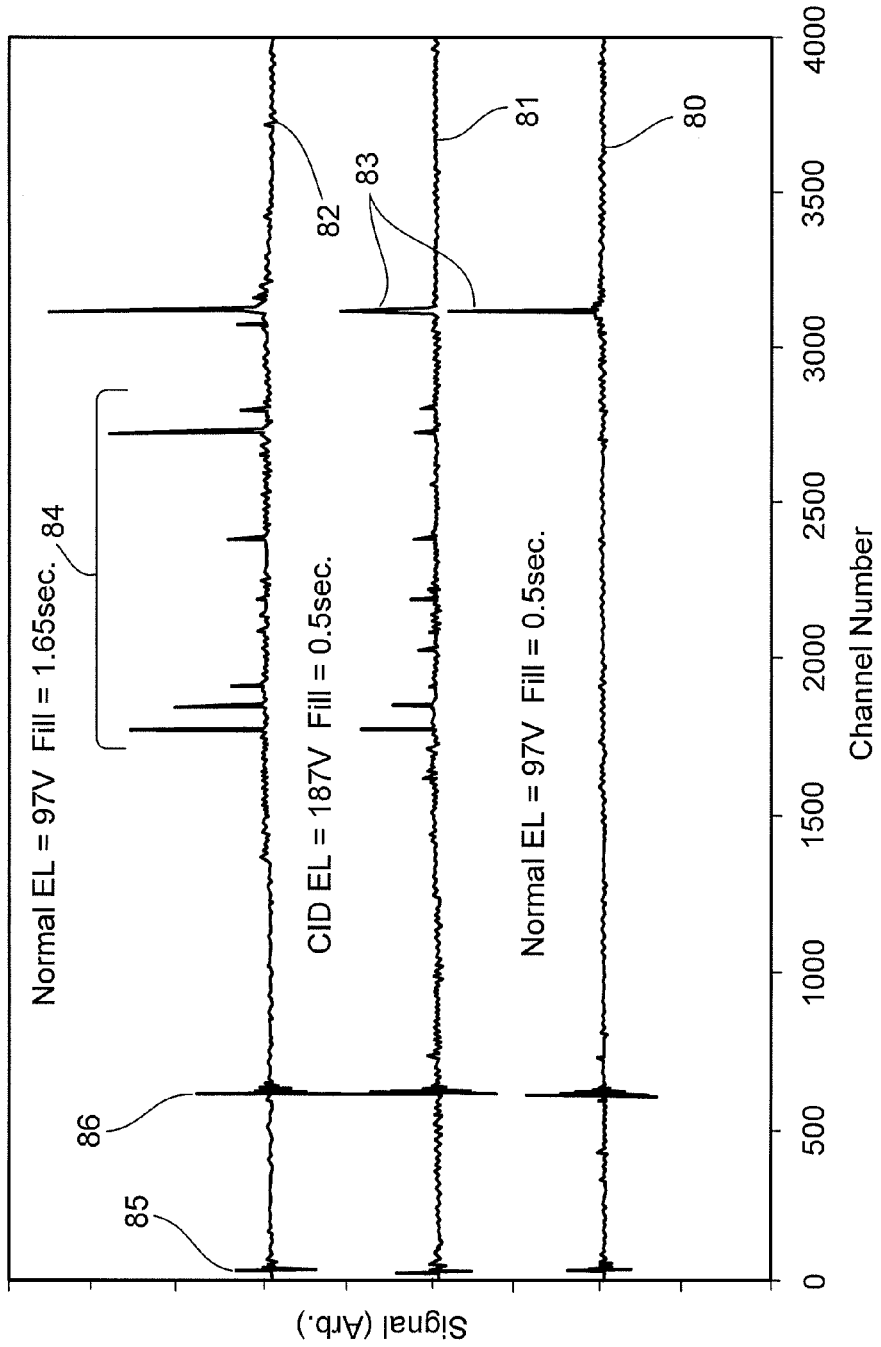
FIG. 8 shows the mass spectrum of the parent ion of Leucine Enkephalin and the mass spectra of the fragment ions from Leucine Enkephalin resulting from filling of the ion guide in a trap operating mode with two levels of capillary to skimmer voltages.

An alternative embodiment of the invention is shown in FIGS. 6 and 7. A four vacuum pumping stage API TOF mass analyzer is diagrammed in FIG. 6 which includes a TOF pulsing region oriented collinear with the multipole ion guide axis. The configuration shown in FIG. 6 from the Electrospray ion source 74 through ion guide 60 to electrostatic lens 66 is essentially the same apparatus and has the same functionality as the region described in FIG. 1 from Electrospray ion source 1, through ion guide 16 to electrostatic lens 27. Hence several of the MS/MS" analysis functions can be performed with the apparatus diagrammed in FIG. 6 in a manner similar to that described above for the apparatus shown in FIG. 1. One primary difference with the collinear pulsing configuration shown in FIG. 6 is that ion guide 60 must always be operating in trapping mode and the ion release pulse length can not be varied without effecting the TOF mass analysis. Only a short duration ion release pulse from ion guide 60 can be used with the collinear TOF pulsing geometry. Increasing the duration of the ion release pulse from ion guide 60 decreases TOF analysis resolution. Some degree of DC lens trapping can be achieved after lens 64 as described by Boyle et. al, (Rapid Commun. Mass Spectrom. 1991, 5, 4000), however, even DC trapping may be inadequate to compensate for the long times required to extract higher m/z value ions from ion guide 60. With shorter duration ion release pulses from ion guide 60 relative m/z transmission discrimination can occur. A larger number of lower m/z value ions can be released from ion guide exit end 63 per time due to their faster ion velocity when compared to higher m/z values in short duration pulses. Consequently, the relative m/z ion population of a TOF ion packet pulsed down flight tube 70 may differ from the relative m/z ion population trapped in ion guide 60 when short duration ion release pulses are used. Also with the constraint that only short duration release pulses can be used to extract ions from ion guide 60, the level of ion guide filling is more difficult to control without shutting off the primary beam. Interrupting the primary beam reduces the effective duty cycle. Another feature of the collinear TOF pulsing geometry is that all ions that leave ion guide 60 are pulsed down flight tube 70. There is no component of primary beam Time-Of-Flight m/z separation before the TOF pulse as is found in orthogonal TOF pulsing when short duration ion release pulses are used. This performance feature of the collinear TOF pulsing geometry may be an advantage or a disadvantage depending on the analytical application. Alternatively, TOF tube 70 may include an ion reflector.

Although the invention has been described in terms of specific preferred embodiments, it will be obvious and understood to one of ordinary skill in the art that various modifications and substitutions are included within the scope of the invention as defined in the appended claims. In addition, various references relevant to the disclosure of the present application are cited above, and are hereby incorporated herein by reference.

What is claimed is:

1. A method, comprising:
    directing ions from an atmospheric pressure ion source to a first ion guide;
    directing ions in the first ion guide to a second ion guide, the second ion guide being a multipole ion guide extending along an axis;
    periodically directing ions along the axis;
    receiving at least some of the ions in a time-of-flight mass analyzer;
    accelerating the ions in the time-of-flight mass analyzer orthogonal to the axis; and
    detecting the accelerated ions, wherein
    the second ion guide is positioned between the first ion guide and the time-of-flight mass analyzer.

2. The method of claim 1, wherein the ions are continuously directed from the atmospheric pressure ion source to the first ion guide.

3. The method of claim 1, wherein the ions are periodically directed to the time-of-flight mass analyzer by trapping ions within one of the ion guides.

4. The method of claim 3, wherein the ions are trapped in the second ion guide.

5. The method of claim 1, further comprising fragmenting ions from the atmospheric pressure ion source and directing the fragmented ions to the time-of-flight mass analyzer.

6. The method of claim 5, wherein the ions are fragmented in the first ion guide.

7. The method of claim 1, further comprising mass filtering ions from the atmospheric pressure ion source before directing the ions to the time-of-flight mass analyzer.

8. The method of claim 7, wherein the ions are mass filtered using the second ion guide.

9. The method of claim 1, wherein the first ion guide is located entirely within a first vacuum chamber and the second ion guide is located entirely within a second vacuum chamber portioned from the first vacuum chamber.

10. The method of claim 9, further comprising maintaining a background gas pressure in the second vacuum chamber below $1 \times 10^{-3}$ ton.

11. The method of claim 10, further comprising maintaining a background gas pressure in the first vacuum chamber between $5 \times 10^{-4}$ ton and $1 \times 10^{-2}$ torr.

\* \* \* \* \*

UNITED STATES PATENT AND TRADEMARK OFFICE
CERTIFICATE OF CORRECTION

| | | |
|---|---|---|
| PATENT NO. | : 8,598,519 B2 | Page 1 of 1 |
| APPLICATION NO. | : 13/164590 | |
| DATED | : December 3, 2013 | |
| INVENTOR(S) | : Craig M. Whitehouse, Thomas Dresch and Bruce A. Andrien, Jr. | |

It is certified that error appears in the above-identified patent and that said Letters Patent is hereby corrected as shown below:

In the Specification

In Column 1, line 10, delete "Aug. 8, 1996," and insert -- Aug. 9, 1996, --

In the Claims

In Column 24, line 34, claim 10, delete "ton." and insert -- torr. --

In Column 24, line 37, claim 11, delete "ton" and insert -- torr --

Signed and Sealed this
Sixth Day of May, 2014

Michelle K. Lee
*Deputy Director of the United States Patent and Trademark Office*